(12) United States Patent
Norton

(10) Patent No.: US 11,439,242 B1
(45) Date of Patent: Sep. 13, 2022

(54) SYSTEMS AND METHODS FOR PROVIDING A CONVERTIBLE CUPHOLDER

(71) Applicant: M. Brent Norton, Provo, UT (US)

(72) Inventor: M. Brent Norton, Provo, UT (US)

(*) Notice: Subject to any disclaimer, the term of this patent is extended or adjusted under 35 U.S.C. 154(b) by 0 days.

(21) Appl. No.: 17/243,271

(22) Filed: Apr. 28, 2021

(51) Int. Cl.
*A47C 7/60* (2006.01)
*A47C 7/62* (2006.01)
*B60N 3/10* (2006.01)

(52) U.S. Cl.
CPC .............. *A47C 7/624* (2018.08); *B60N 3/103* (2013.01)

(58) Field of Classification Search
CPC ........ A47C 7/624; A47C 7/622; B60N 3/103; B60N 3/10
USPC ..................................................... 297/188.18
See application file for complete search history.

(56) References Cited

U.S. PATENT DOCUMENTS

| | | | |
|---|---|---|---|
| 5,007,612 A * | 4/1991 | Manfre | A01K 97/00 220/DIG. 9 |
| 5,865,412 A * | 2/1999 | Mason | A47C 7/70 248/311.2 |
| 7,284,737 B2 * | 10/2007 | Kane | A47G 23/0225 248/226.11 |
| 2011/0121619 A1 * | 5/2011 | Chappell | A47C 7/624 297/188.01 |
| 2012/0086245 A1 * | 4/2012 | Nelson | A47C 7/624 297/188.18 |
| 2019/0357688 A1 * | 11/2019 | Dobson | F16M 13/022 |
| 2020/0116299 A1 * | 4/2020 | Huang | B60N 3/103 |
| 2021/0007495 A1 * | 1/2021 | Snir | A47C 7/624 |
| 2021/0045535 A1 * | 2/2021 | Wilcox | B65D 81/3813 |

* cited by examiner

*Primary Examiner* — Mark R Wendell
(74) *Attorney, Agent, or Firm* — David B. Tingey; Bryant J. Keller; Kirton McConkie

(57) ABSTRACT

A convertible cupholder device that is configured to have a cupholder element of the device be selectively rotated and/or otherwise be moved between a variety of positions is described. As a result of its construction, when the convertible cupholder is coupled to a movable object (e.g., a pivoting member of a convertible bench), the cupholder element can be moved to and/or be retained in one or more desired positions (e.g., an upright position) when the movable object is pivoted and/or otherwise moved through a range of motion. Other implementations are described.

20 Claims, 24 Drawing Sheets

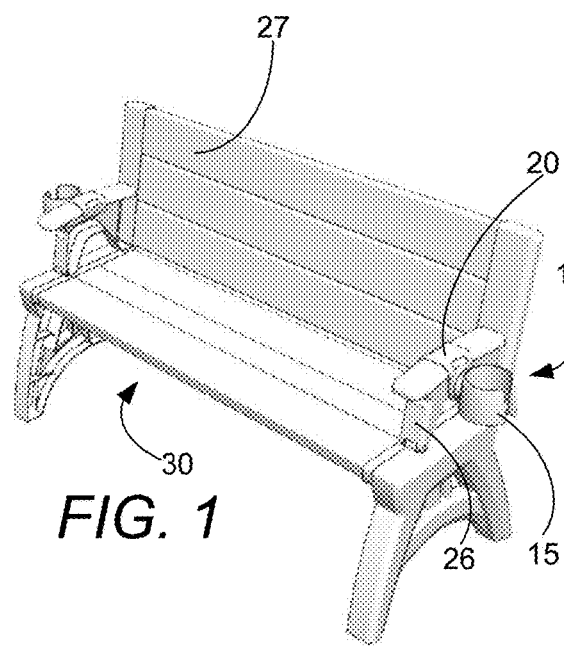
FIG. 1
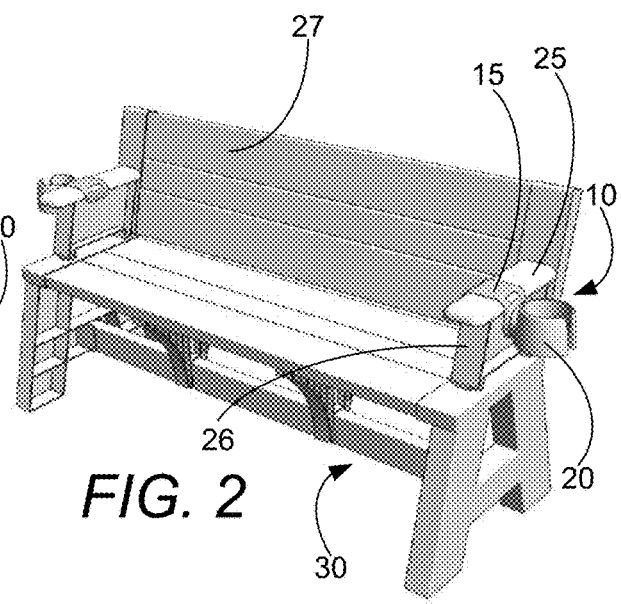
FIG. 2
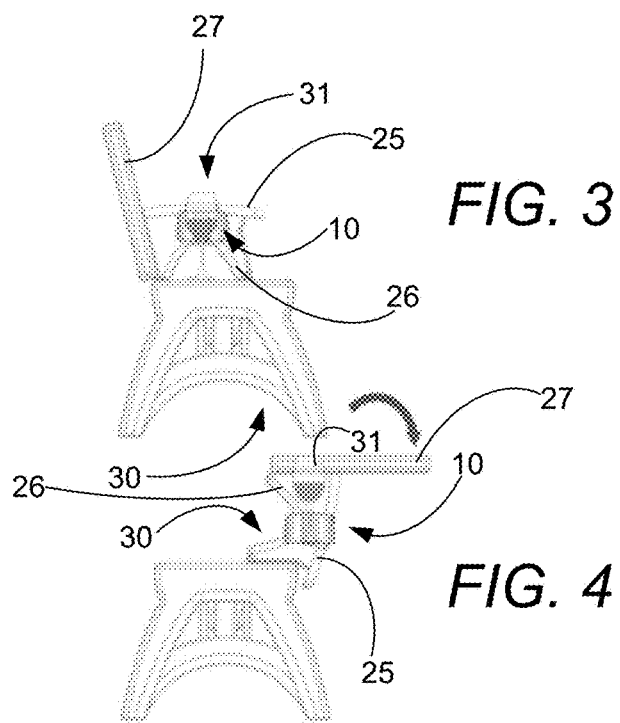
FIG. 3
FIG. 4

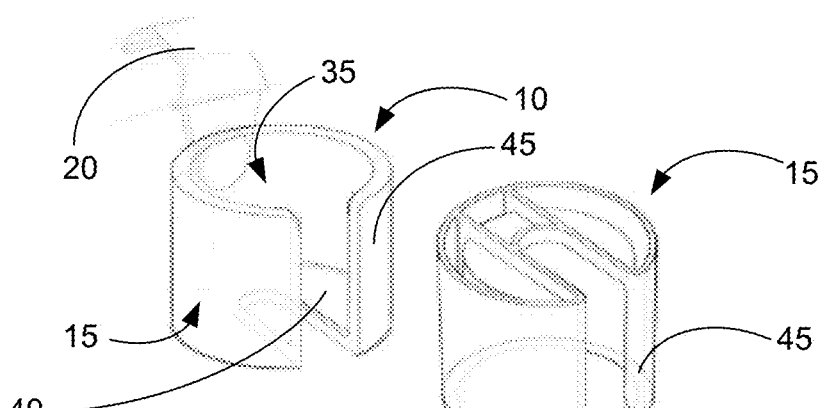
FIG. 15A
FIG. 15B
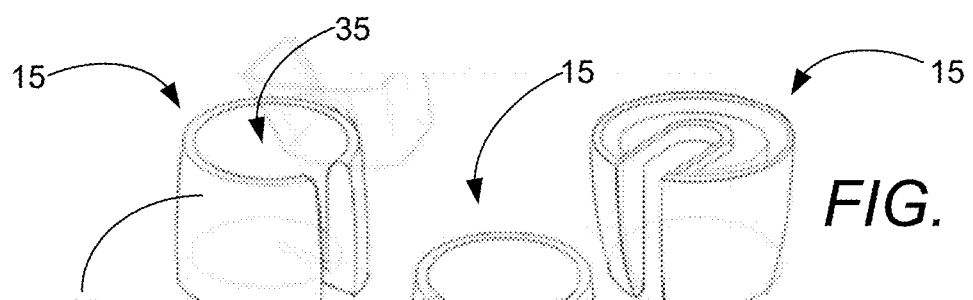
FIG. 16A
FIG. 16B
FIG. 16C
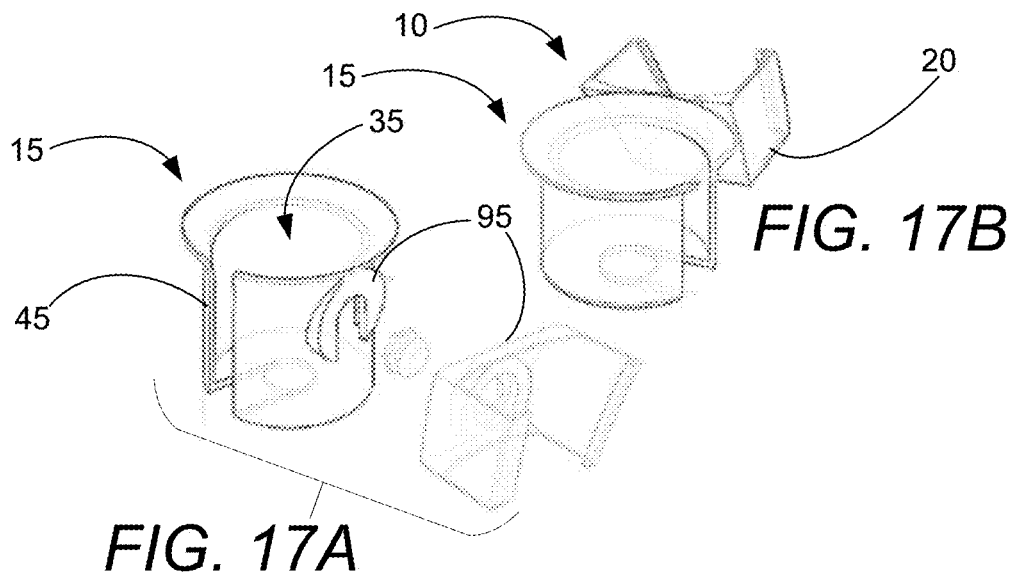
FIG. 17A
FIG. 17B

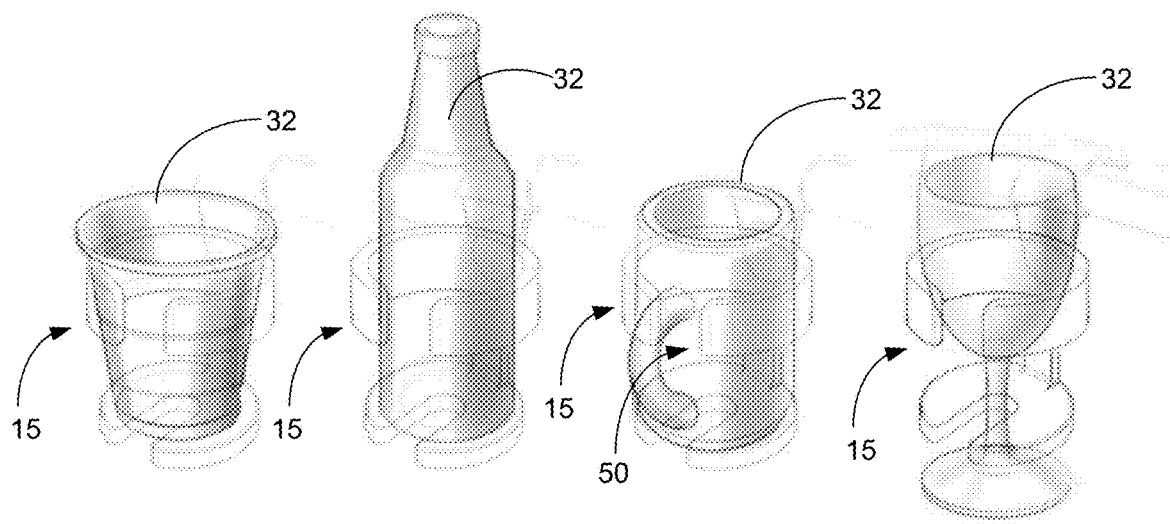
*FIG. 21A*   *FIG. 21B*   *FIG. 21C*   *FIG. 21D*
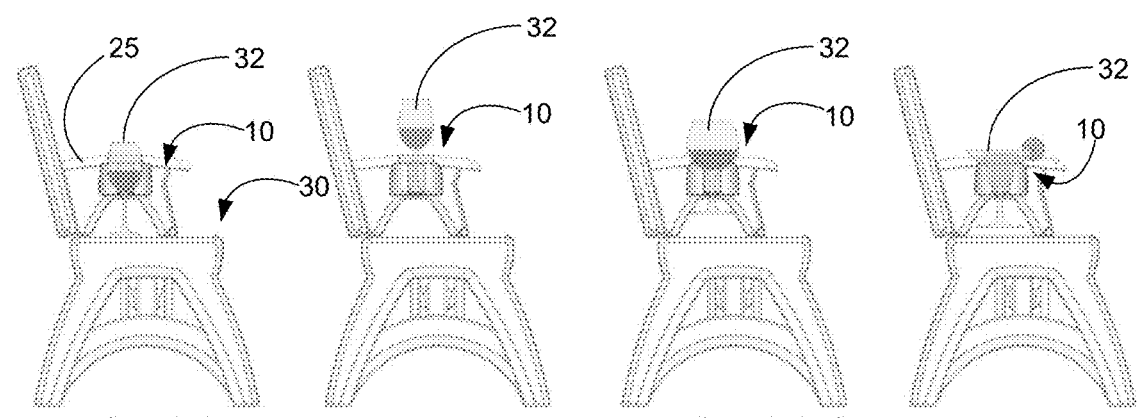
*FIG. 22A*   *FIG. 22B*   *FIG. 22C*   *FIG. 22D*
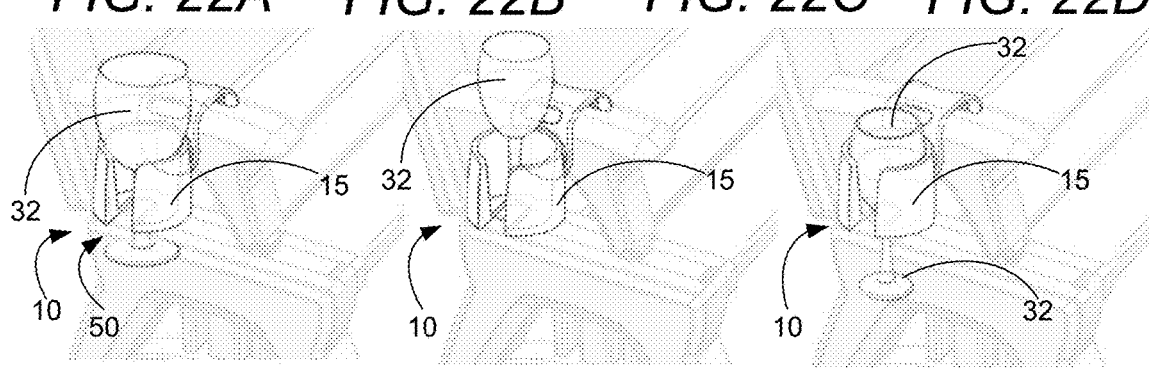
*FIG. 23A*   *FIG. 23B*   *FIG. 23C*

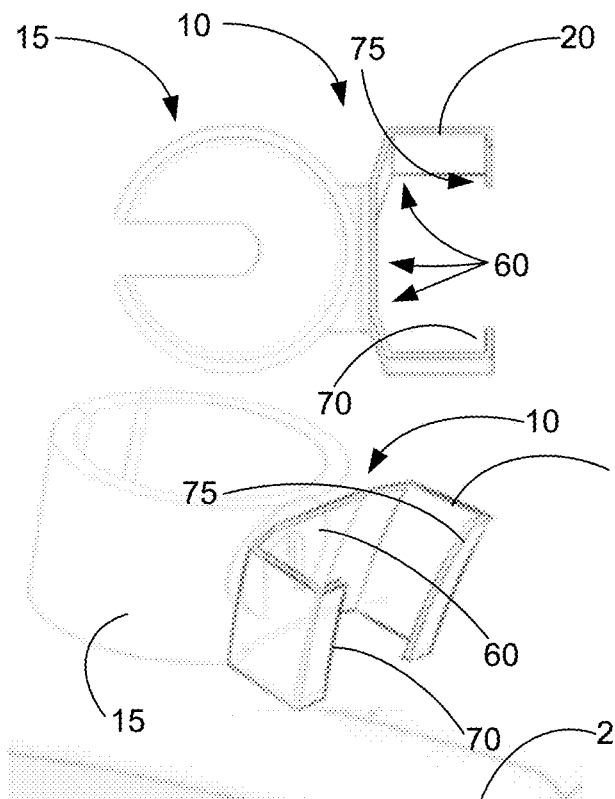
FIG. 24E
FIG. 24F
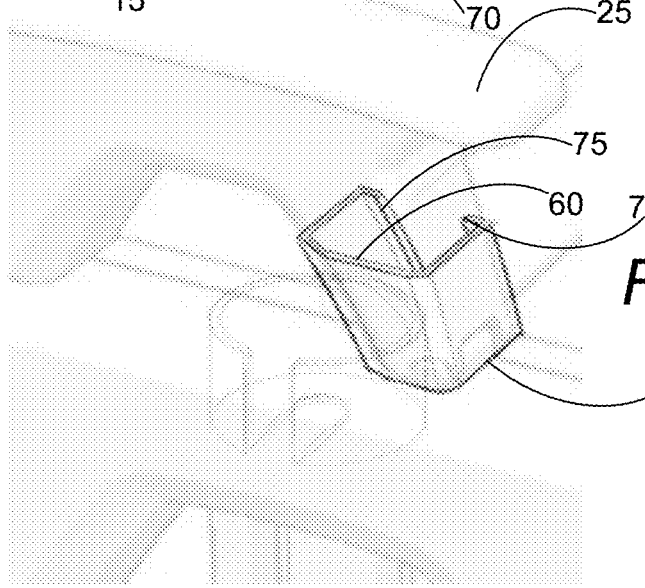
FIG. 24G

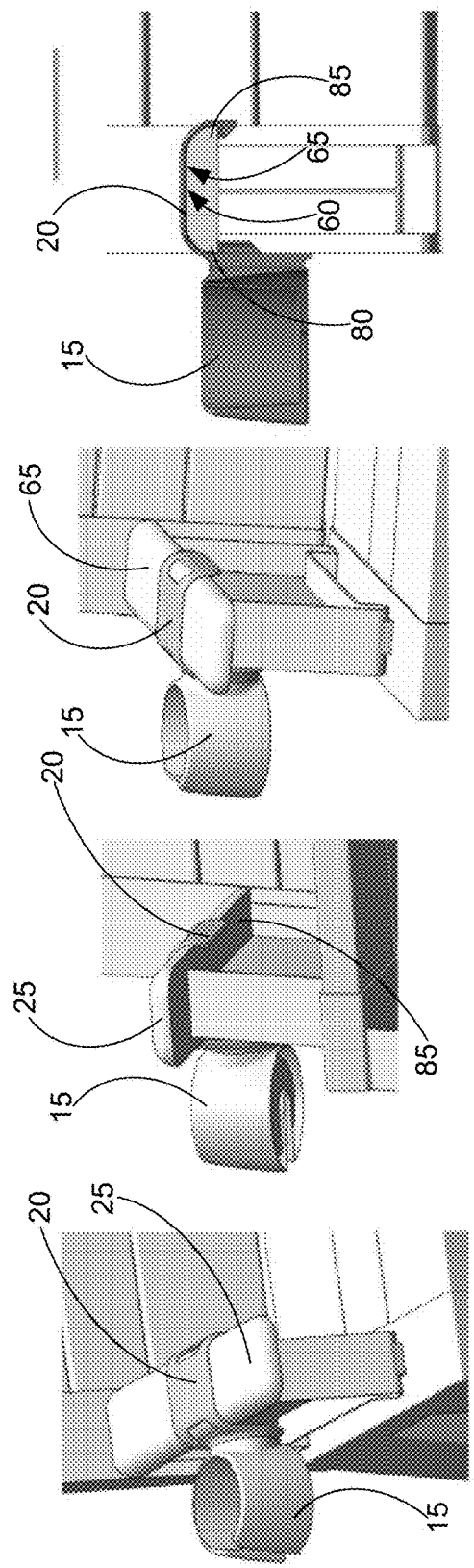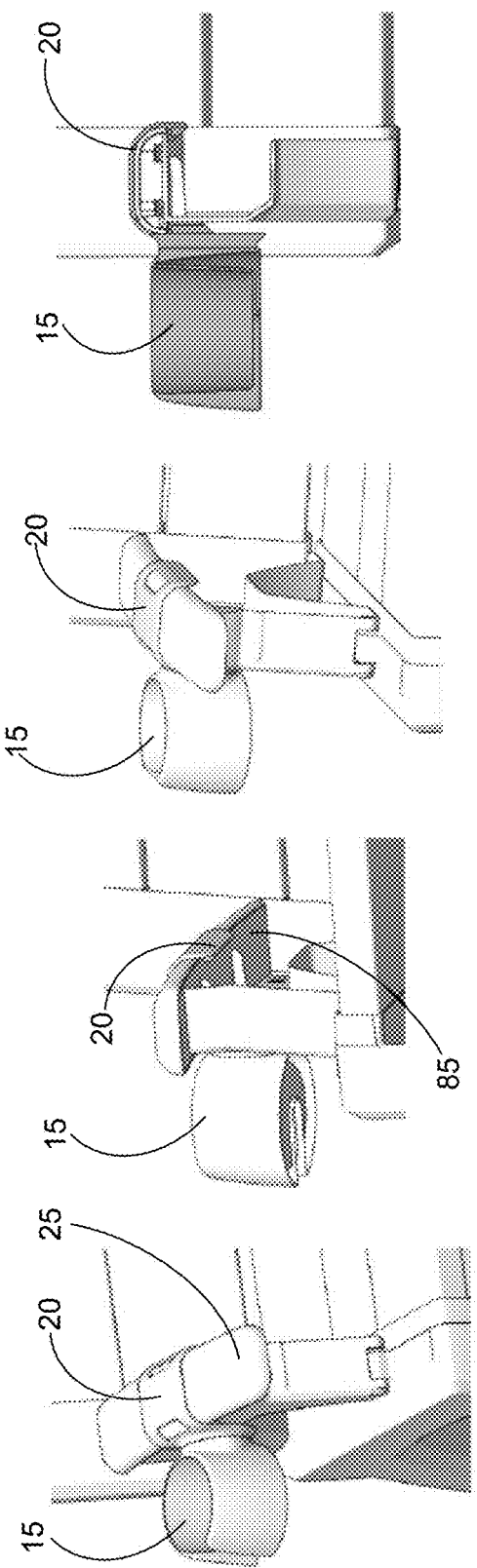

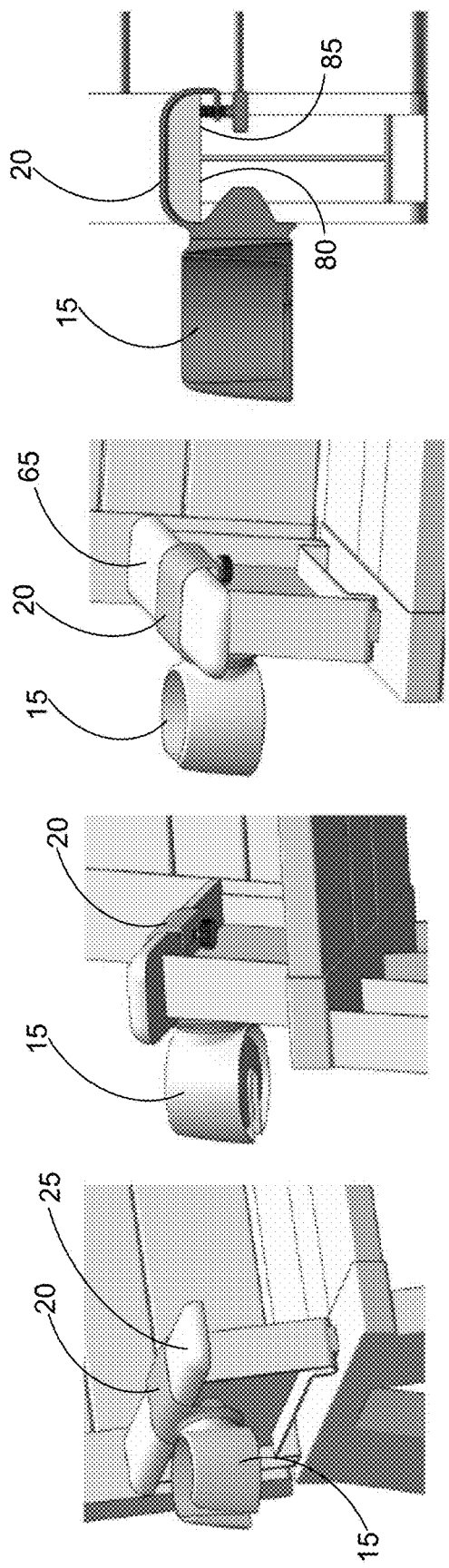
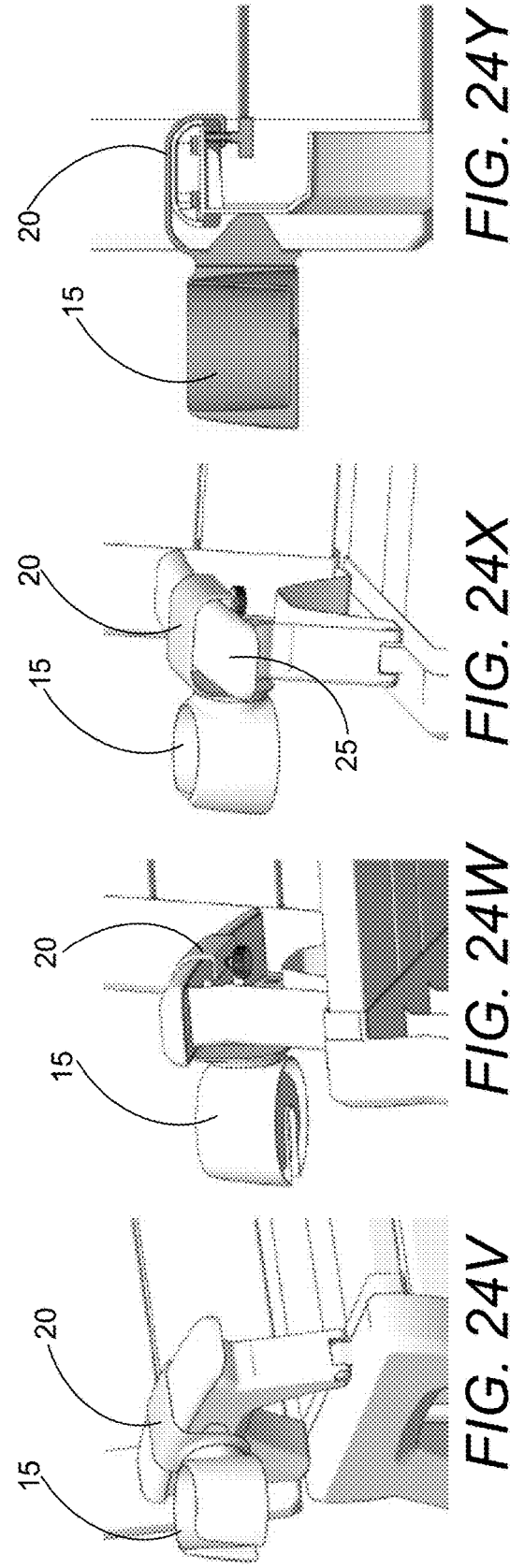

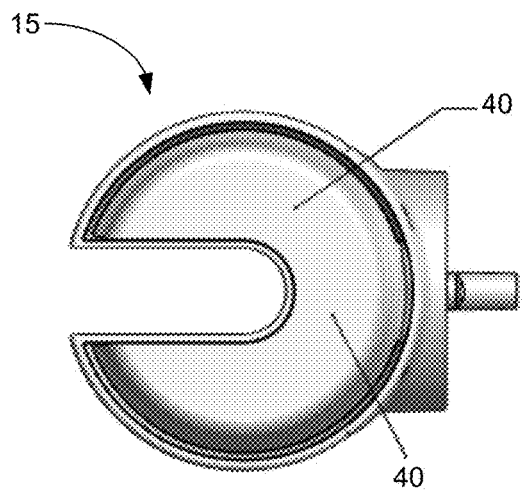
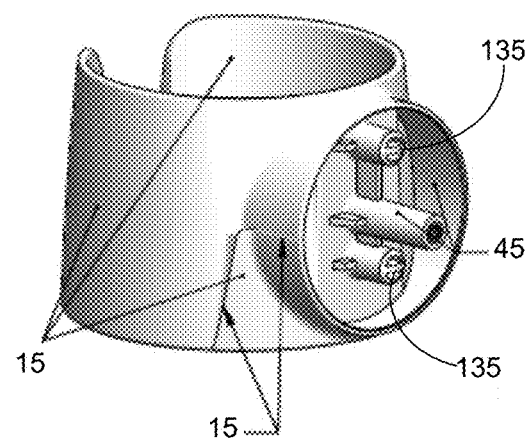
FIG. 26A FIG. 26B
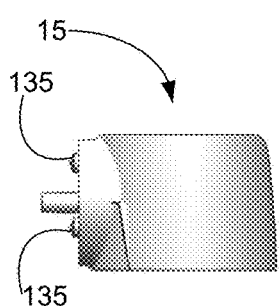 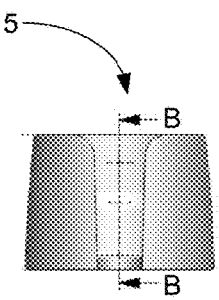 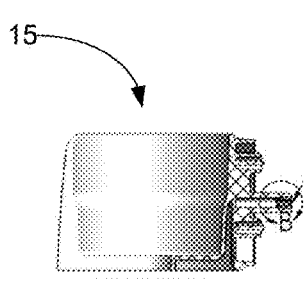 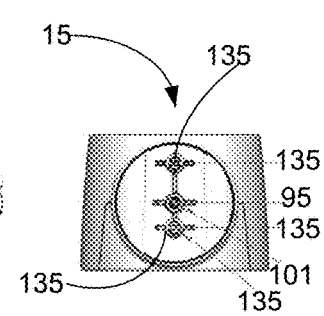
FIG. 26C FIG. 26D FIG. 26E FIG. 26F
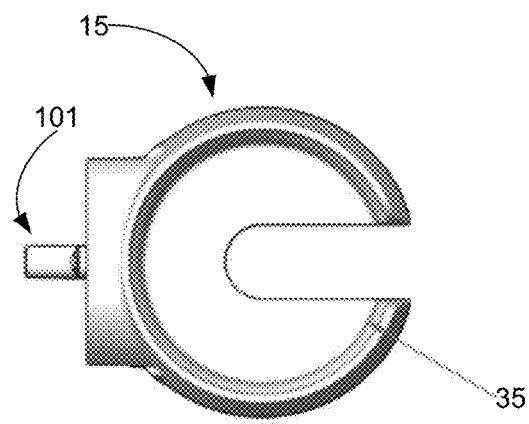 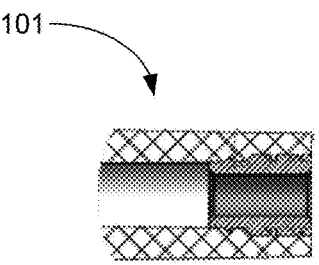
FIG. 26G FIG. 26H

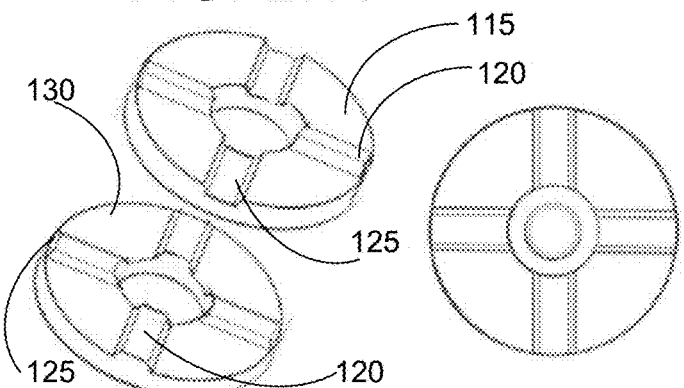
FIG. 27A
FIG. 27B
FIG. 27C
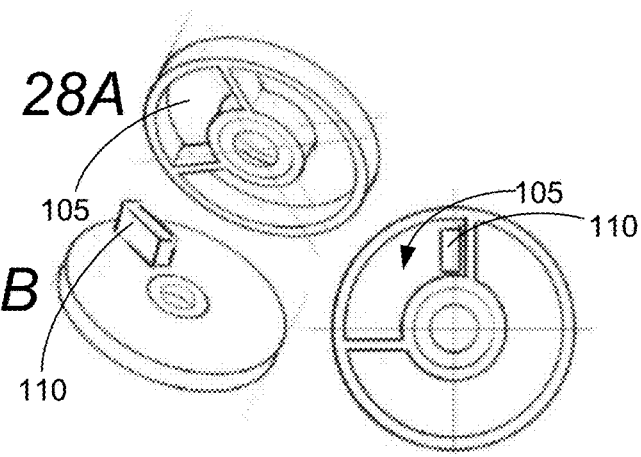
FIG. 28A
FIG. 28B
FIG. 28C
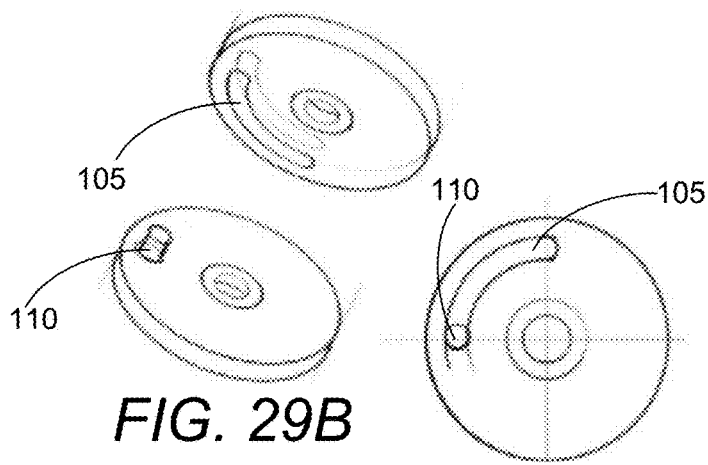
FIG. 29A
FIG. 29B
FIG. 29C

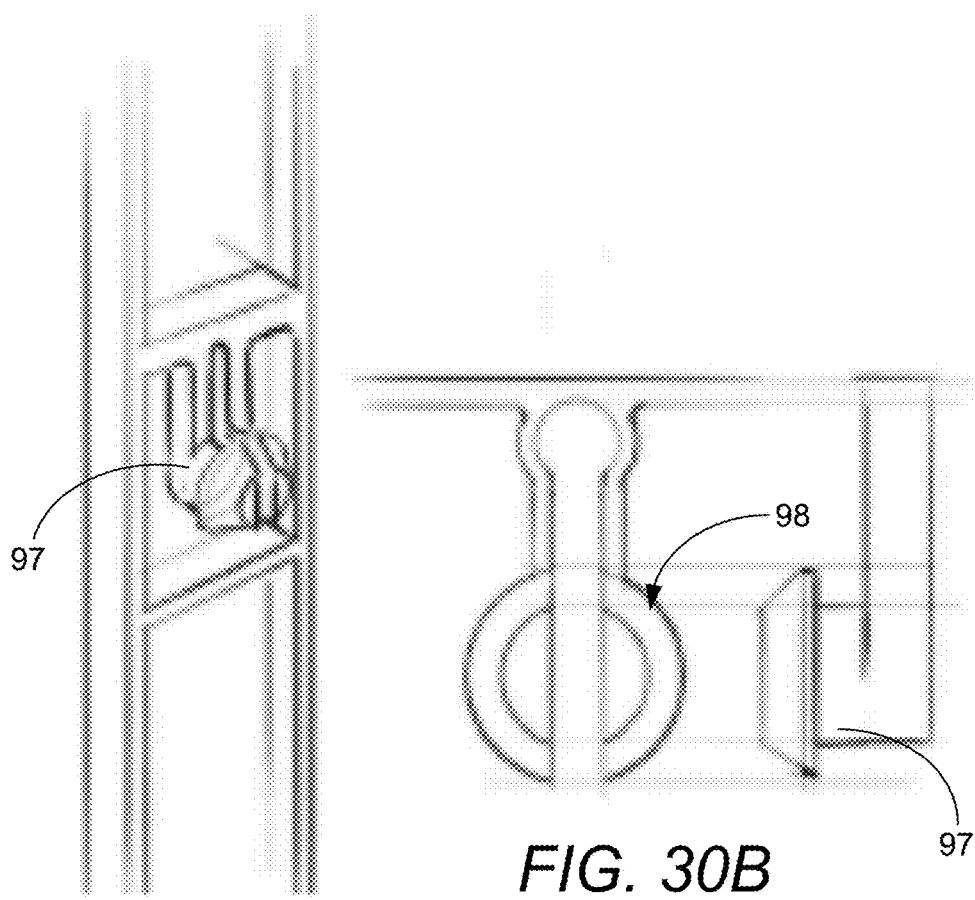
FIG. 30A
FIG. 30B
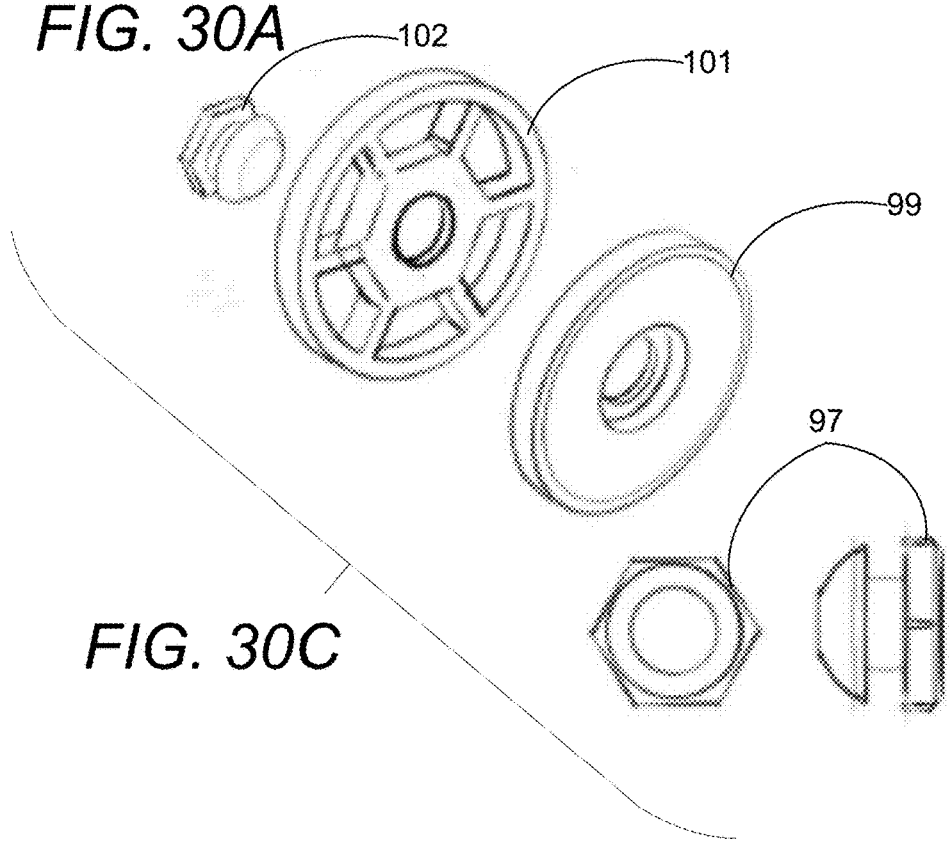
FIG. 30C

SYSTEMS AND METHODS FOR PROVIDING A CONVERTIBLE CUPHOLDER

BACKGROUND

Field

The described systems and methods relate to cupholders. More particularly, some implementations relate to systems and methods for providing a convertible cupholder device that is configured to have a cupholder element of the device be selectively rotated and/or otherwise be moved between a variety of positions, such that when the cupholder element is coupled to a movable object (e.g., a pivoting member of a convertible bench), the cupholder element can be moved to and/or be retained in one or more desired positions (e.g., an upright position) when the movable object is pivoted and/or otherwise moved through a range of motion.

Background and Related Art

Often times, people who are drinking a beverage do not want to hold that beverage in their hand for the entire time that they are drinking the beverage. Instead, after a beverage has been poured, opened, and/or otherwise been made ready for consumption, many people prefer to set their beverage down when they are not drinking it. Indeed, by not holding a beverage in one's hand, that person can relax and/or use that hand for a variety of other purposes (e.g., driving, eating, making hand signals, and/or to perform any other suitable function).

In this regard, a person may put her or his beverage in any of a variety of suitable locations between sips or swallows. For instance, when a person is not drinking a beverage, such person may place the drink on a table, on a counter, in a drink holder, on a coaster, and/or in any other suitable location. In some cases, however, it can be helpful to place the beverage in a drink holder.

While drink holders can perform a variety of purposes, in some cases, they are configured to hold a drink in a position that prevents the drink from spilling. Moreover, it should be noted that drink holders have, in many parts of our lives, become fairly ubiquitous. Indeed, some drink holders are free standing devices that are configured to hold a drink on a flat surface, such as a tray, table, or a desk. In some other cases, however, drink holders are: provided at fast-food restaurants and/or built into automobiles, airplanes, boats, buses, trains, couches, and/or in many other suitable locations.

While a wide variety of drink holders have been found to be useful for holding beverages, such drink holders are not necessarily without their shortcomings. For instance, some drink holders are relatively limited: in their utility, in the locations in which they can be used, in the types of containers and items they can hold, and/or in a one or more other ways.

Thus, while systems and methods currently exist that are used to hold beverages, some challenges still exist, including those listed above. Accordingly, it would be an improvement in the art to augment or even replace current techniques with other techniques.

SUMMARY

The described systems and methods relate to cupholders. More particularly, some implementations relate to systems and methods for providing a convertible cupholder device that is configured to have a cupholder element of the device be selectively rotated and/or otherwise be moved between a variety of positions, such that when the cupholder element is coupled to a movable object (e.g., a pivoting member of a convertible bench), the cupholder element can be moved to and/or be retained in one or more desired positions (e.g., an upright position) when the movable object is pivoted and/or otherwise moved through a range of motion.

While the described convertible cupholder device can be used with any suitable support object, in some implementations, the convertible cupholder is configured to be coupled to an armrest and/or any other suitable component that is configured to rotate and/or otherwise move through a range of motion. Indeed, in some implementations, the described convertible cupholder is configured to be selectively coupled to an armrest of a seat (e.g., a convertible bench), where the armrest is configured to pivot through a range of motion to convert the seat (or convertible bench) into seat having a table surface and/or into a seat (or convertible bench) having a backrest.

While the described convertible cupholder device can have any suitable component, in some implementations, the convertible cupholder includes a cupholder element and an armrest coupler. In some such implementations, the cupholder element is configured to hold a cup and/or any other suitable container, and the cupholder element is pivotally coupled to the armrest coupler. Additionally, in some implementations, the armrest coupler is configured to be selectively coupled to, and to be decoupled from, an armrest (e.g., an armrest of a convertible bench) and/or any other suitable support structure.

Where the cupholder element is configured to rotate with respect to the armrest coupler, the cupholder element can be rotatably coupled to the armrest coupler in any suitable manner that allows the cupholder element to be rotated, pivoted, and/or otherwise moved with respect to the armrest coupler. Thus, in some implementations in which the cupholder device is coupled to a convertible bench (or a seat that has an armrest, or other component, that moves between two positions to provide the seat with a table top in one position and a backrest in another position), the cupholder element is configured to hold a drink (and/or any other suitable item) in a desired orientation (e.g., vertical) when the armrest is in a first position as well as when the armrest is in a second position.

In some implementations, one or more pivoting mechanisms are used to rotatably couple the cupholder element with the armrest coupler. While the convertible cupholder can comprise any suitable pivoting mechanism, some examples of suitable pivoting mechanisms include, but are not limited to, one or more: hinges, pivot joints, bar linkages, flexure pivots, axles, ball and socket joints, posts and/or other members that are rotatably received in a recess, detent mechanisms, spring-loaded detent mechanisms in which one of the cupholder element and the armrest coupler comprise a process and the other of the cupholder element and the armrest coupler comprise a recess that is configured to selectively mate with the process, rotational ratcheting mechanisms, axles, bearings, rotary joints, rack and pinion mechanisms, slot and peg linkages, and/or any other suitable mechanisms that allow the cupholder to be rotated with respect to the armrest coupler.

In some implementations, however, the pivoting mechanism includes a spring-loaded detent mechanism in which one of the cupholder element and the armrest coupler (e.g., the cupholder element) comprises a process and the other of the cupholder element and the armrest coupler (e.g., the armrest coupler) comprises (and/or is coupled to) a recess that is configured to selectively mate with the process. In some such implementations, the cupholder is configured to selectively be captured in any suitable number of set positions, including, without limitation, 1, 2, 3, 4, 5, 6, 7, or more positions.

Indeed, in some implementations, the pivoting mechanism is configured to selectively hold the cupholder element in two positions. In some other implementations, however, the pivoting mechanism is configured to hold the cupholder element in at least three positions. Thus, in some cases, the described convertible cupholder device is configured to be rotated to hold a cup and/or other item in a desired orientation (e.g., in a vertical and/or any other suitable orientation), both when the device is coupled to an armrest (and/or other support structure) when the armrest is pivoted between two positions, and when the device is switched from a left armrest to a right armrest (and vice versa).

The armrest coupler can couple to any suitable support object, including, without limitation, to one or more armrests, pivoting members, movable supports, support structures, backrests, table surfaces, frames, and/or any other suitable support. In some cases, however, the armrest coupler is configured to couple to a right and/or left armrest of a convertible bench.

The armrest coupler can be coupled to an armrest and/or any other suitable support object in any suitable manner. Indeed, in some implementations, the armrest coupler is configured to couple to a support object via one or more frictional engagements, mechanical engagements, snap fits, clamping mechanisms, fasteners, threaded engagements, slide-on couplings, clips, screws, springs, and/or in any other suitable manner. In some cases, however, the armrest coupler includes a bracket arm (or simply an arm) that is configured to extend across a first surface of the armrest, with the arm having a first end portion and a second end portion. In some such cases, the first end portion of the arm comprises a first contact surface that is configured to contact a second surface of the armrest, with the second surface being disposed partially and/or substantially opposite to the first surface of the armrest. Moreover, in some cases, the second end portion of the arm comprises a second contact surface that is configured to contact a third surface of the armrest, with the third surface being disposed partially and/or substantially opposite to the first surface of the armrest. Although in some cases, the second surface and the third surface comprise different surfaces, in some other cases, they comprise the same surface.

In some cases, the first and/or second end portions of the arm comprise one or more tightening mechanisms that are configured to selectively apply pressure to the first, second, third, and/or any other suitable surfaces of the armrest (or other support object) when the armrest coupler is coupled to the armrest (or other support object). In this regard, the tightening mechanism can comprise any suitable component, including, without limitation, one or more springs, threaded shafts, resilient members, clips, bindings, screws, and/or suitable component that can be used to selectively increase and/or decrease a pressure that is applied by the armrest coupler to the support object (e.g., the armrest). Indeed, in some cases, the tightening mechanism comprises a threaded shaft that is configured to be twisted to at least one of (i) selectively increase and (ii) selectively decrease a pressure that is applied to the second surface of the armrest when the armrest coupler is coupled to the armrest.

While the described convertible cupholder may be particularly useful for holding cups, glasses, goblets, tumblers, bottles, mugs, stemware, flasks, and/or any other suitable fluid-holding container, those skilled in the art will appreciate that the described systems and methods can be used in a variety of different applications and in a variety of different areas of manufacture. For instance, the described systems and methods can be used not only with fluid containers, but some implementations of the described systems and methods are configured to be used with any other suitable items. Indeed, in some implementations, instead of holding only fluid containers, the described convertible cupholder is configured to hold one or more umbrellas, misters, canes, remote controls, sets of keys, books, magazines, trays, utensils, napkins, objects, knick-knacks, and/or any other suitable item or items. Additionally, in some cases, in addition to and/or in place of coupling to a movable portion of a convertible bench, some implementations of the described convertible cupholder device are configured to be coupled to any other suitable support object, including, but not limited to, one or more movable armrests (e.g., armrests in a vehicle), umbrella posts, foldable chairs, and/or any other suitable support object.

These and other features and advantages of the described systems and methods will be set forth or will become more fully apparent in the description that follows and in the appended claims. The features and advantages may be realized and obtained by means of the instruments and combinations particularly pointed out in the appended claims. Furthermore, the features and advantages of the described systems and methods may be learned by the practice of thereof or will be obvious from the description and drawings, as set forth hereinafter.

BRIEF DESCRIPTION OF THE DRAWINGS

In order that the manner in which the above-recited and other features and advantages of the present systems and methods are obtained, a more particular description of the described systems and methods will be rendered by reference to specific embodiments thereof, which are illustrated in the appended drawings. Understanding that the drawings are not necessarily drawn to scale or in proper proportion, and that the drawings depict only typical embodiments of the described systems and methods and are not, therefore, to be considered as being limiting in scope, the described systems and methods will be described and explained with additional specificity and detail through the use of the accompanying drawings in which:

FIGS. 1-2 each illustrate a front perspective view of a convertible bench comprising a convertible cupholder, wherein the convertible bench and the convertible cupholder are each in a first position in accordance with some representative embodiments;

FIG. 3 illustrates a side elevation view of the convertible bench and the convertible cupholder in which the bench is in the first position (namely a bench position that provides a backrest) and in which the convertible cupholder is in a first position in accordance with a representative embodiment;

FIG. 4 illustrates a side elevation view of the convertible bench and the convertible cupholder in which the bench is in a second position (namely a table position that provides a tabletop surface) and in which the convertible cupholder is in a second position in accordance with a representative embodiment;

FIGS. 15A-20 illustrate different views of different representative embodiments of a cupholder element of the convertible cupholder;

FIGS. 21A-21D each illustrate a perspective view of the cupholder element holding a fluid vessel in accordance with some representative embodiments;

FIGS. 22A-22D each illustrate a side elevation view of the convertible bench in its first position and the convertible cupholder in its first position with the convertible cupholder holding a fluid vessel in accordance with some representative embodiments;

FIGS. 23A-23C each illustrate a perspective view of a portion of the convertible bench, with the convertible cupholder holding a fluid vessel in a different configuration in accordance with some representative embodiments;

FIGS. 25A-26C illustrate various views of the convertible cupholder in accordance with some representative embodiments;

FIGS. 26A-26D illustrate various views of the cupholder element in accordance with some representative embodiments;

FIG. 26E illustrates a cross-sectional view of the cupholder element of FIG. 26D, taken along line B-B;

FIGS. 26F-26G illustrate various views of the cupholder element in accordance with some embodiments;

FIG. 26H illustrates an enlarged view of element B in FIG. 26E; and

FIGS. 27A-30C illustrate a variety of components of a pivoting mechanism of the convertible cupholder in accordance with some embodiments.

DETAILED DESCRIPTION

Figure 5:
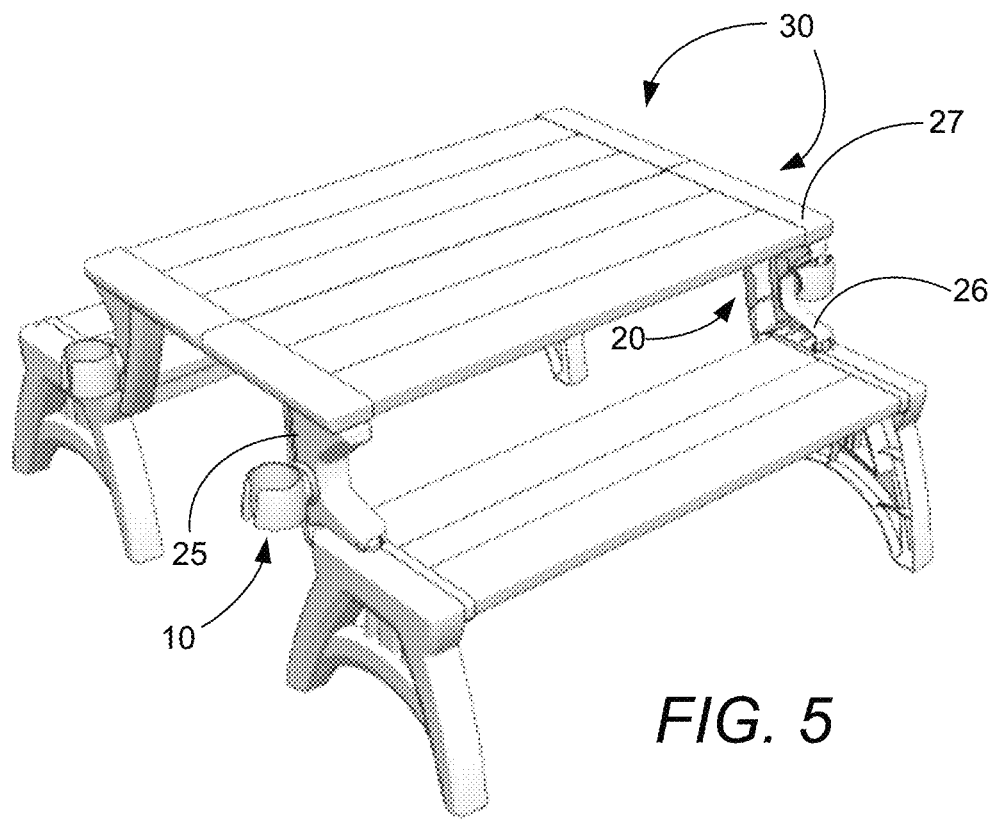
FIG. 5 illustrates a perspective view of two convertible benches in the second position (in which each of the benches presents a tabletop) with each bench having the convertible cupholder in the second position on one armrest and in a third position on another armrest of the bench in accordance with a representative embodiment.

The described systems and methods relate to cupholders. More particularly, some implementations relate to systems and methods for providing a convertible cupholder device that is configured to have a cupholder element of the device be selectively rotated and/or otherwise be moved between a variety of positions, such that when the cupholder element is coupled to a movable object (e.g., a pivoting member of a convertible bench), the cupholder element can be moved to and/or be retained in one or more desired positions (e.g., an upright position) when the movable object is pivoted and/or otherwise moved through a range of motion.

While the described convertible cupholder device (or convertible cupholder) can perform any suitable function, in some embodiments, it is configured to hold one or more objects and to be coupled to one or more support objects. Moreover (and as shown in FIGS. 1-2), some embodiments of the convertible cupholder 10 comprise a cupholder element 15 that is pivotally, rotationally, and/or otherwise movably coupled to a cupholder coupler (or armrest coupler) 20. Thus, in some embodiments, the convertible cupholder is configured to have its cupholder coupler be coupled to a support object that is configured to rotate and/or otherwise move through a range of motion so that when the support object is moved from one position to another, the cupholder element can be rotated with respect to the cupholder coupler such that the cupholder coupler can maintain a desired orientation (e.g., an upright orientation).

The convertible cupholder 10 can be coupled to any suitable support object, including, without limitation, to one or more armrests, convertible tables/benches, frameworks, scaffolds, structures, tabletops, backrests, foldable chairs, benches, consoles, umbrella posts, movable supports, and/or any other object that is capable of holding the convertible cupholder. In some embodiments, the convertible cupholder is configured to be coupled to a support object that is configured to pivot or otherwise move between two or more positions. By way of non-limiting illustrations, FIGS. 1-6 show some embodiments in which the convertible cupholder 10 is coupled to an armrest 25, armrest support 26, backrest/table top 27 and/or any other suitable component of a convertible bench 30 (or a seat that is configured to be converted from a bench with a backrest to a table with a tabletop and vice versa). Thus (as shown in FIGS. 1-6) the cupholder element 15 can be moved to be in a desired orientation (e.g., upright) when the support object (e.g., the armrest 25) is pivoted to two or more different positions.

With respect to the cupholder element 15, the convertible cupholder 10 can comprise any suitable number of cupholder elements, including, but not limited to, 1, 2, 3, 4, 5, 6, or more. By way of non-limiting illustration, FIGS. 1-9 show some embodiments in which the convertible cupholder 10 comprises one cupholder element 15.

The cupholder element 15 can be configured to hold any suitable item or items, including, without limitation, one or more cups, cans, glasses, goblets, tumblers, bottles, bowls, teacups, chalices, vessels, jars, pots, vials, decanters, jugs, mugs, stemware, flasks, canteens, insulated fluid containers, coolers, umbrellas, misters, phones, keys, coins, trinkets, remote controls, utensils, napkins, canes, sets of keys, books, magazines, trays, utensils, napkins, objects, knick-knacks, and/or any other suitable item or items. By way of non-limiting illustration, FIGS. 3-4 show some embodiments in which the convertible cupholder is configured to hold stemware 31. Moreover, FIGS. 7-8 and 21A-23C show that, in some embodiments, the convertible cupholder 10 is configured to hold any suitable type of fluid container 32.

Figure 9:
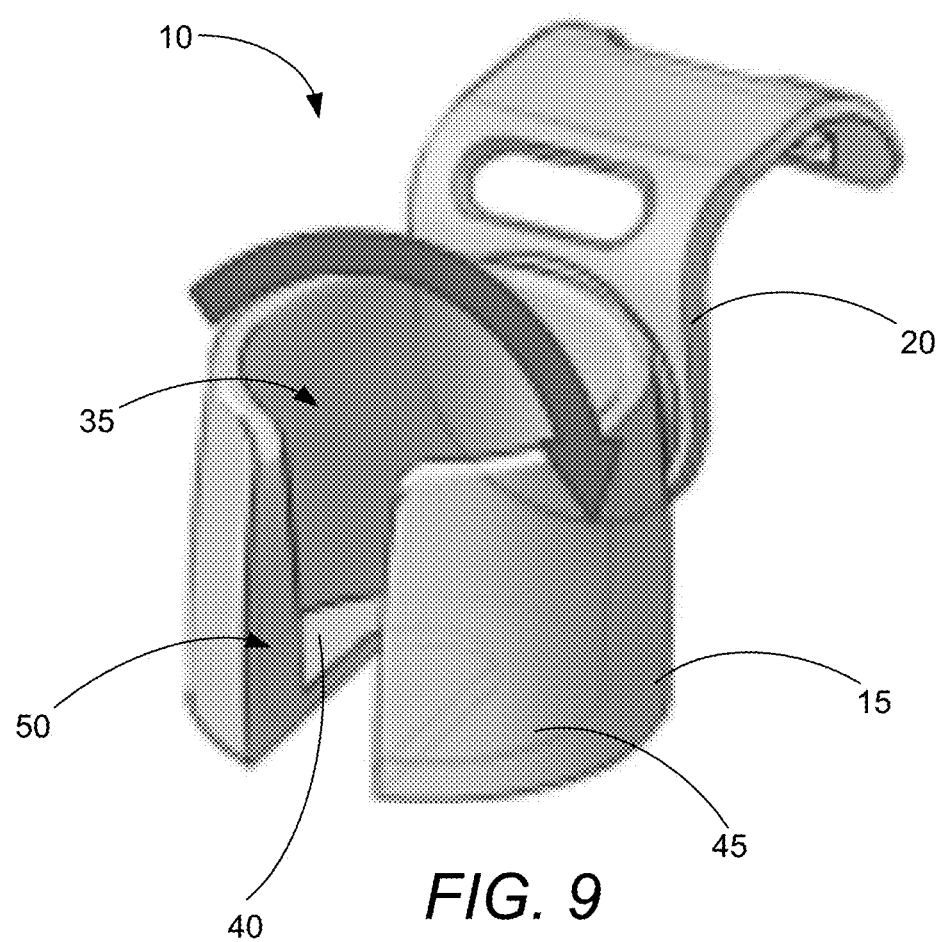
FIGS. 9-12 each illustrate a different perspective view of the convertible cupholder in accordance with some representative embodiments.
Figure 11:
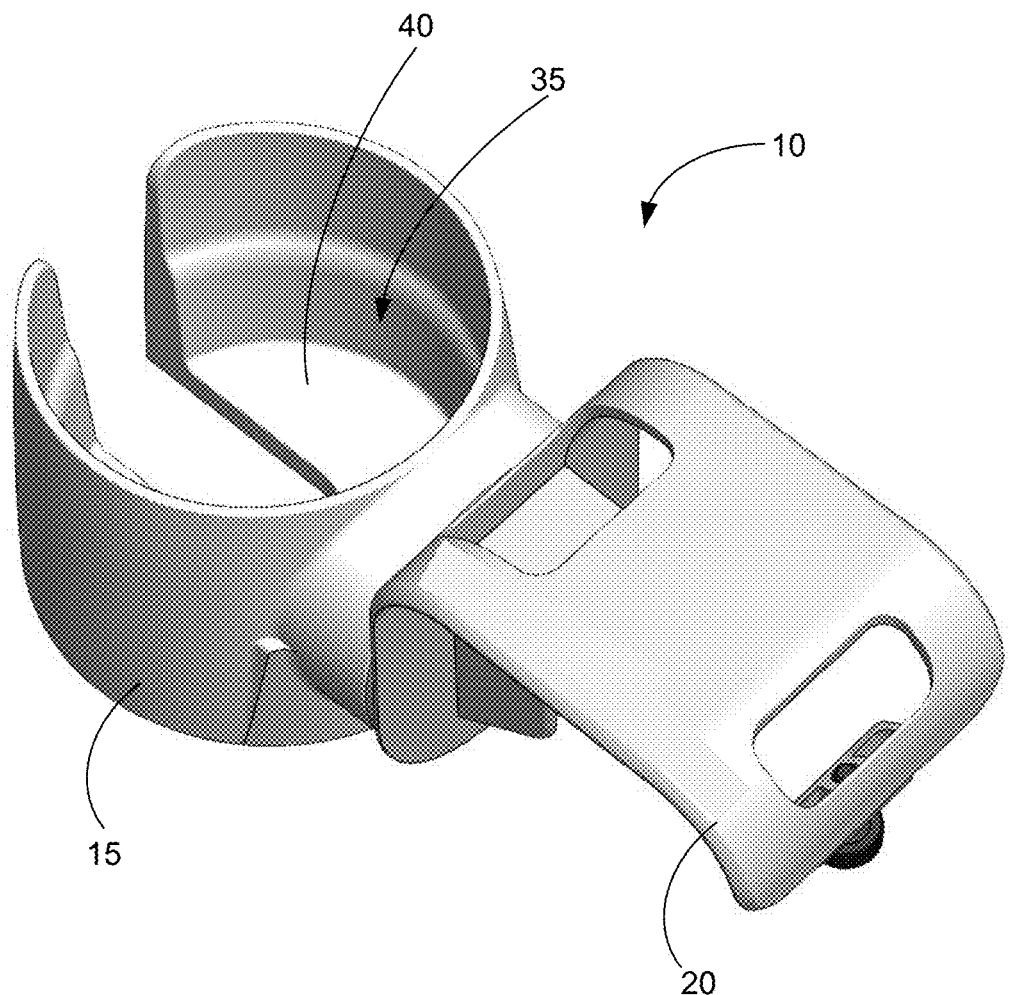
Figure 12:
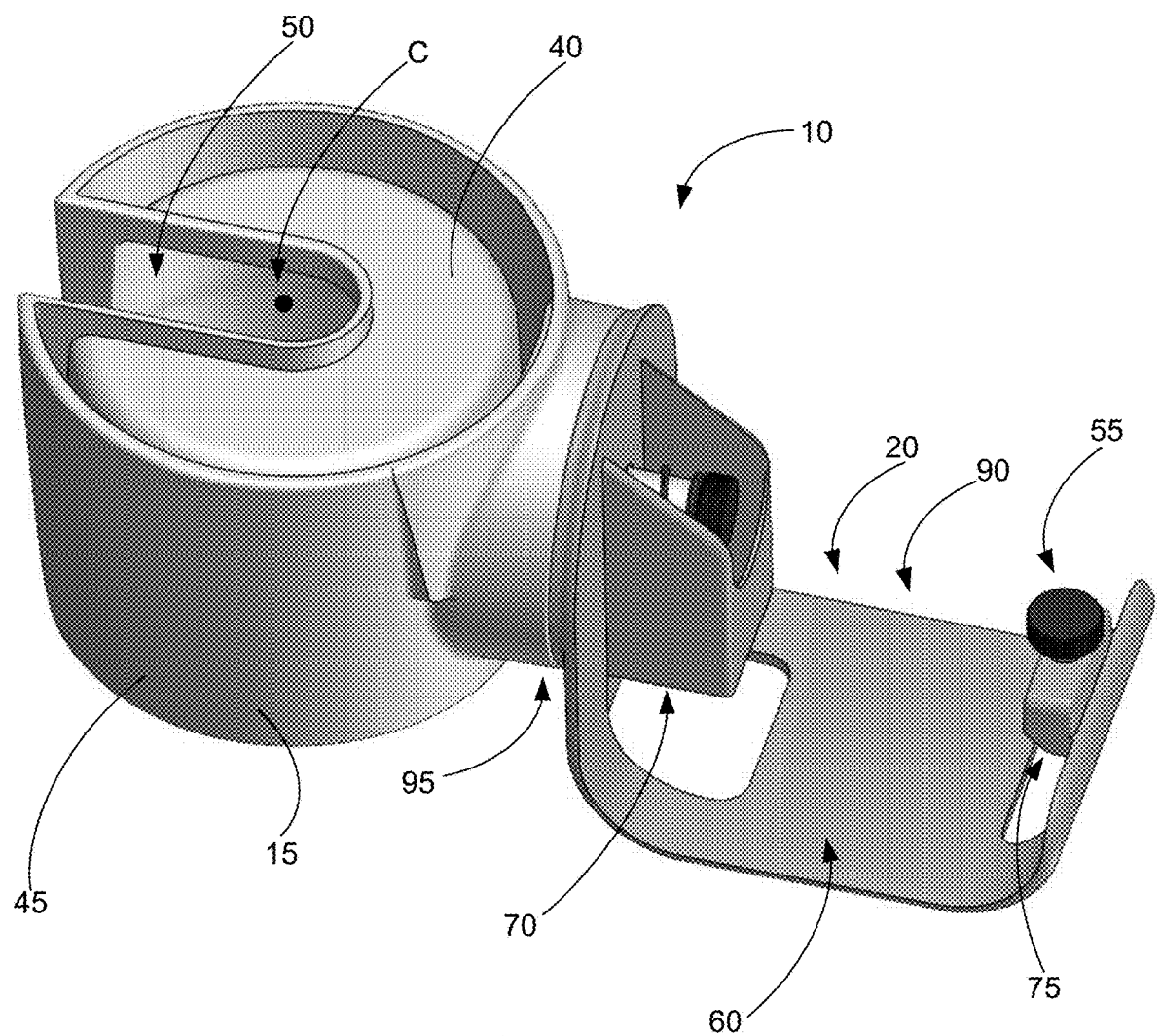
Figure 13:
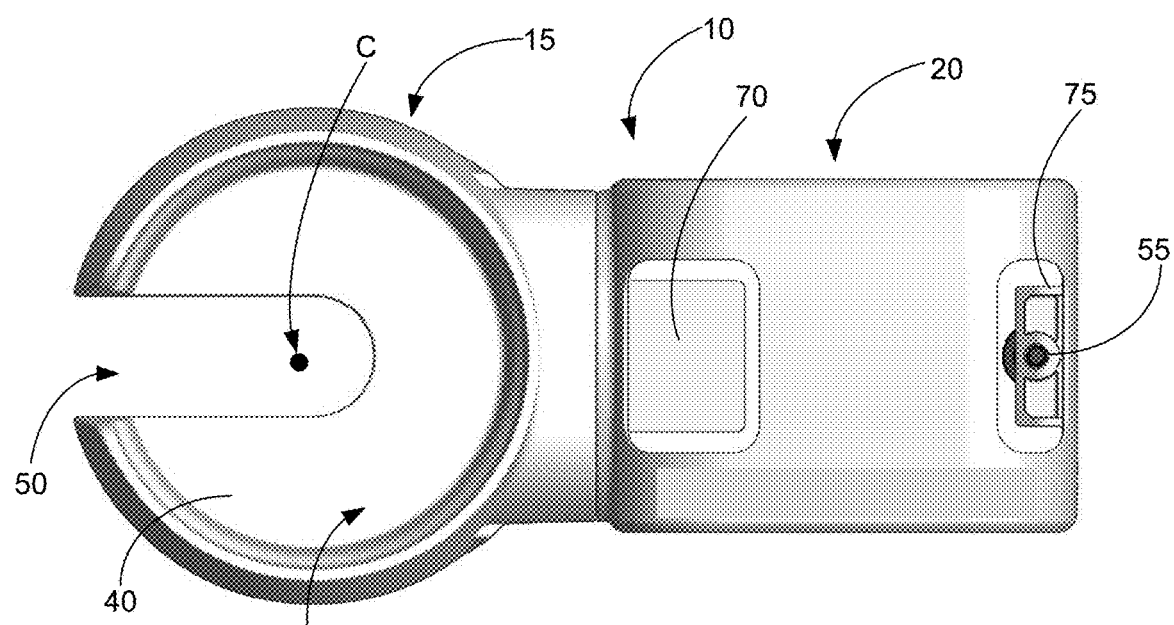
FIG. 13 illustrates a top plan view of the convertible cupholder in accordance with a representative embodiment.
Figure 14:
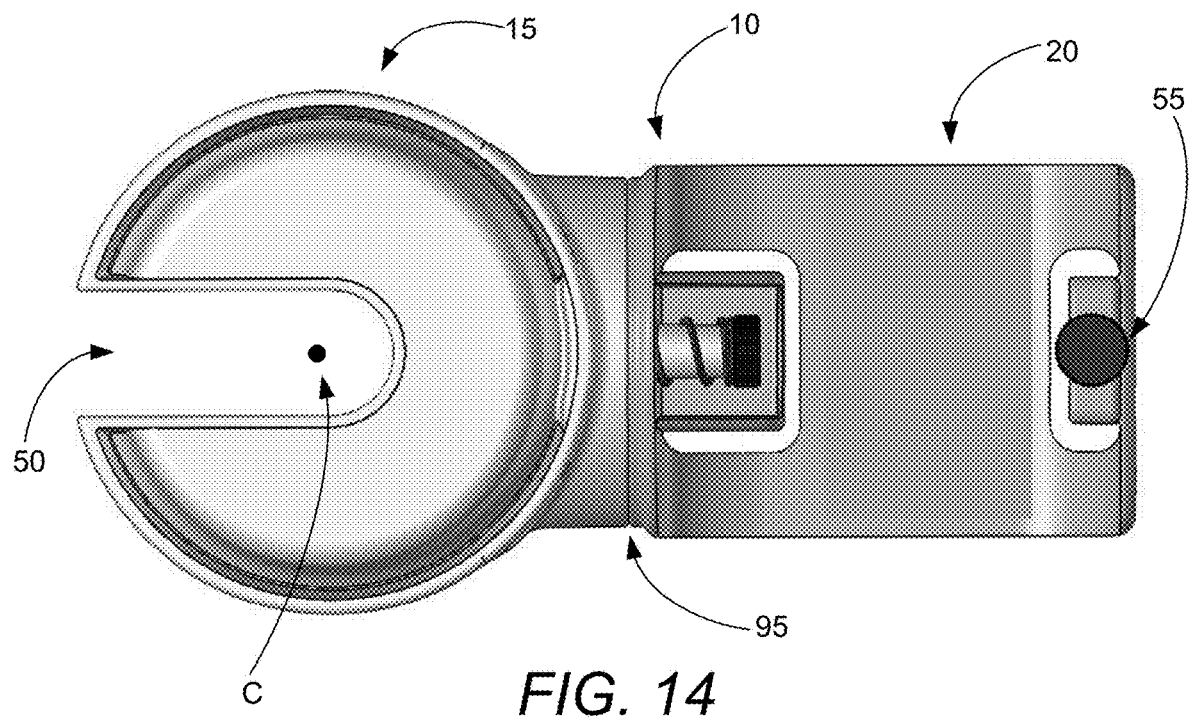
FIG. 14 illustrates a bottom plan view of the convertible cupholder in accordance with a representative embodiment.

The cupholder element 15 can have any suitable component or characteristic that allows it to function as described herein. For instance, FIG. 9 shows that some embodiments of the cupholder element 15 comprise a receptacle 35 for receiving a fluid container (and/or any other suitable item). In this regard, the cupholder element can comprise any suitable component that allows it to form a receptacle that is capable of holding a fluid container and/or any other suitable object. Indeed, in some embodiments, the cupholder element comprises one or more base surfaces, which can include one or more solid surfaces, slotted surfaces, sloped surfaces, substantially flat surfaces, lips, grates, extensions, projections, and/or any other component or components at a bottom portion of the cupholder element that is configured to prevent a fluid container and/or any other suitable object from passing all of the way through the cupholder element. By way of non-limiting illustration, FIGS. 9, 11, and 12 show some embodiments in which the cupholder element 15 comprises a substantially flat base surface 40.

Figures 18A, 18B, 18C:
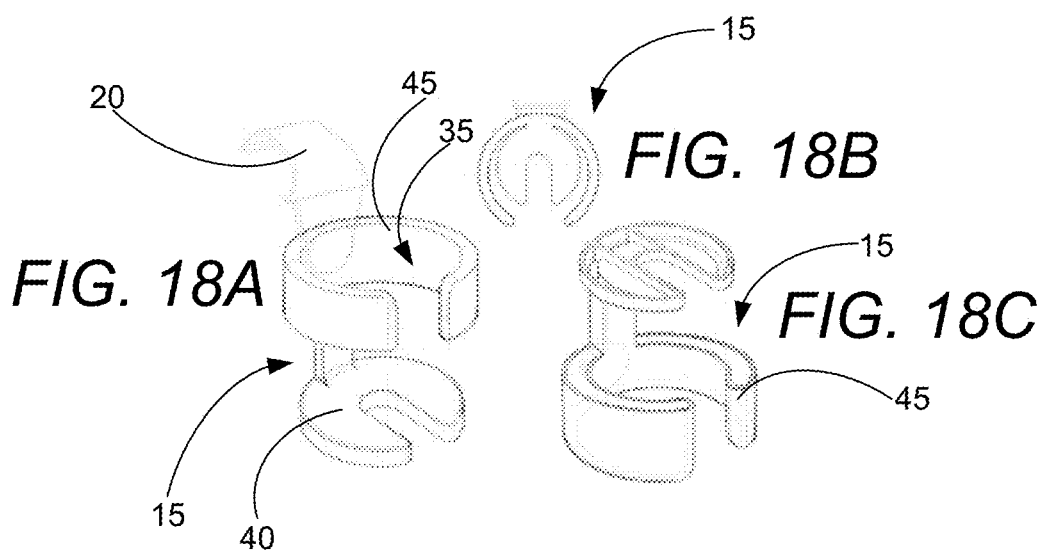
Figures 19A, 19B, 19C:
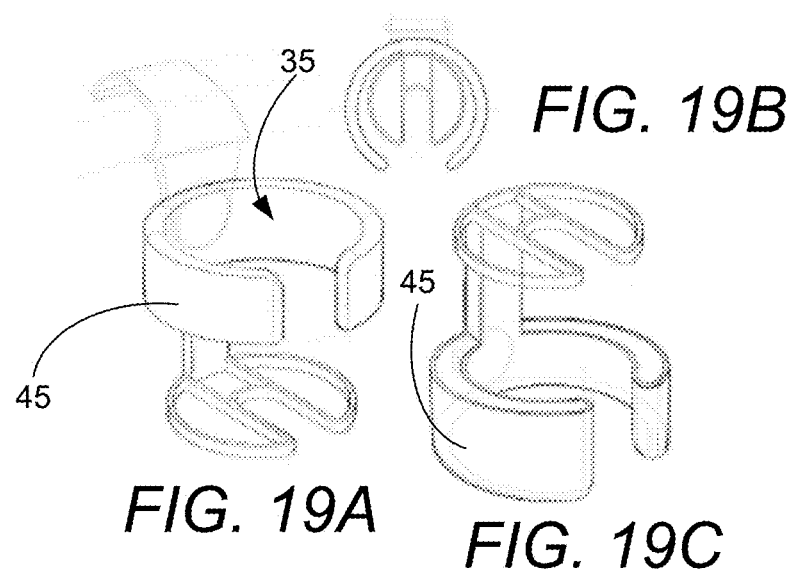
Figure 20:
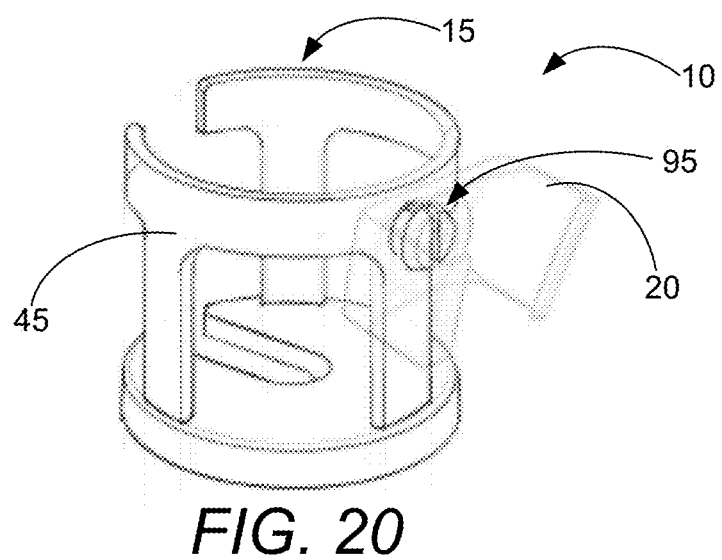

In some embodiments, the cupholder element 15 comprises one or more rings, extensions, scaffolds, rails, frameworks, and/or other walls that: extend around a portion of the base surface 40; help define the receptacle 35; help prevent a fluid container and/or any other suitable object from falling out of a side of the cupholder coupler; provide a surface to which the cupholder coupler 20 can couple; and/or that perform any other suitable function. By way of non-limiting illustration, FIGS. 15A-20 show some embodiments in which the cupholder element 15 comprises one or more walls 45 that help define the receptacle 35. In particular, FIGS. 15A-15B show some embodiments in which the cupholder element 15 comprises substantially straight walls 45 that extend from a perimeter of the base surface 40. Moreover, FIGS. 16A-16C show some embodiments in which the cupholder element comprises arched walls 45. Additionally, FIGS. 17A-17B show some embodiments in which the cupholder element 15 comprises walls 45 having a single layer and/or a flared rim. Moreover, FIGS. 18A-18C show that some embodiments comprise one or more floating rings that serve as walls 45 with such walls being coupled (directly or indirectly) to a substantially flat base surface 40. Furthermore, FIGS. 19A-19C show that some embodiments comprise one or more floating rings that serve as walls 45 with a grate serving as the base surface 40. Additionally, FIG. 20 shows that, in some embodiments, the cupholder element comprises one or more rings and columns that function as walls 45.

Figure 10:
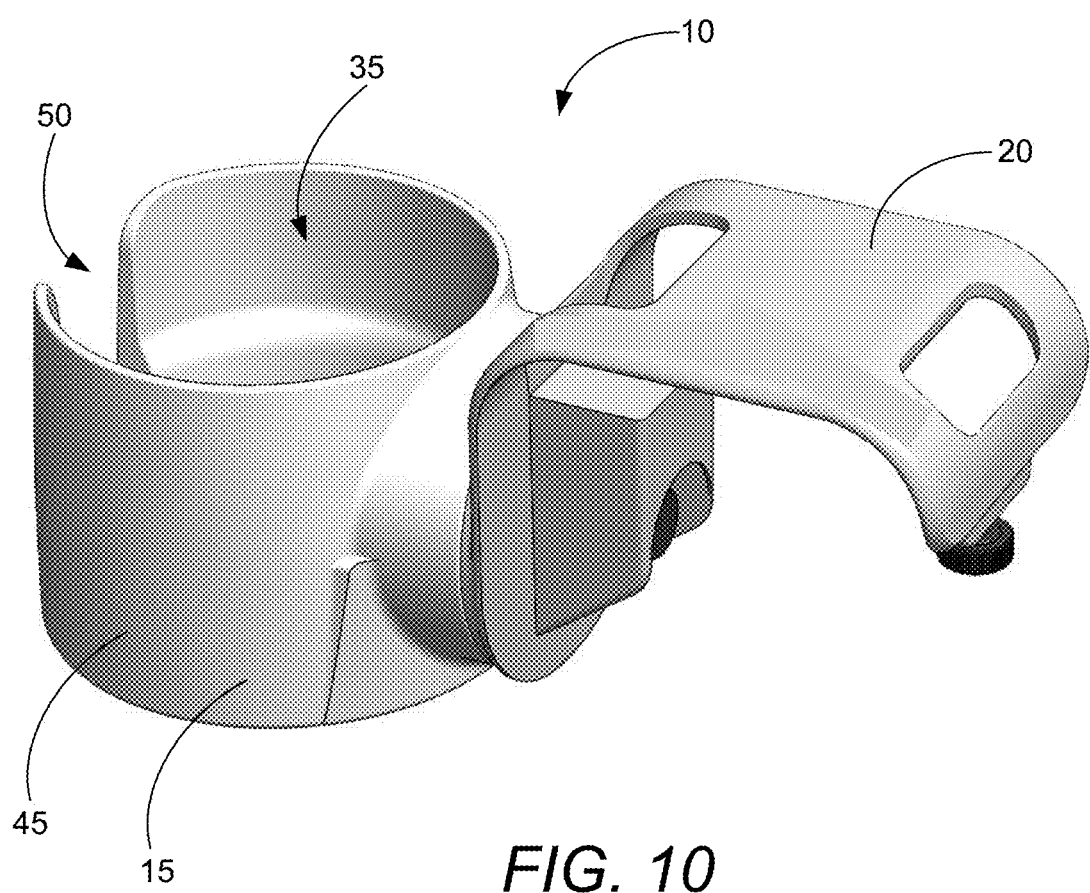

The receptacle 35 of the cupholder element 15 can have any suitable shape, including, without limitation, being: substantially cylindrical, polygonal, symmetrical, asymmetrical, polygonal prismatic, and/or any other suitable shape. Additionally, while some embodiments of the receptacle have a single inner diameter, in some other embodiments, the receptacle has multiple inner diameters. By way of non-limiting illustration, FIGS. 10-11 show some embodiments in which receptacle 35 has multiple inner diameters.

In some embodiments, one or more walls 45 extend fully around the receptacle 35 and/or the base surface 40. In some other embodiments, however, one or more walls extend only partially around a perimeter of the receptacle and/or the base surface. Indeed, in some embodiments, the wall 45 defines one or more gaps. In this regard, such gaps can extend through any suitable portion of the cupholder element, including, without limitation, through any suitable portion of the wall and/or base element. In some embodiments, for instance, the wall defines a gap that extends partway from a distance extending between a top of the wall and the base surface. In some other embodiments, the gap extends all of the way from a first end (e.g., a top) to a second end (e.g., a bottom) of the wall. In some embodiments, the gap extends into the base surface 40. By way of non-limiting illustration, FIGS. 9 and 12-14 show some embodiments in which the wall 45 and base surface 40 define a gap 50 that extends into the base surface 40, past a center point C of a width of the base surface (see FIG. 12).

Where the cupholder element 15 comprises one or more gaps 50 in one or more walls 45 and/or base members 40, the gaps can serve any suitable purpose, including, without limitation, allowing a stem of a glass to pass through and/or be disposed in the gap, allowing a handle of object (e.g., a coffee mug) to extend out the cupholder element, allowing spilled fluid and/or condensation to leak from the cupholder element, allowing one or more fingers to enter the gap, and/or for any other suitable purpose. By way of non-limiting illustration, FIGS. 21A-23C show some manners in which some embodiments of the cupholder element 15 (e.g., a cupholder element defining one or more gaps 50) can hold a fluid container 32.

In addition to the aforementioned components, the described convertible cupholder 10 can comprise any other suitable component or characteristic that allows it to function as intended. In one example, some embodiments of the cupholder element 15 comprises one or more materials, including, without limitation, polypropylene, polystyrene, Styrofoam, and/or any other suitable material or materials that are configured to allow the cupholder to thermally insulate its contents. In some embodiments, the cupholder element comprises one or more members that are configured to be biased against and to apply pressure to an object (e.g., a cup) that is placed in the cupholder element. In some embodiments, the cupholder element optionally comprises one or more inserts (e.g., comprising rubber and/or any other suitable material) that are configured to help maintain one or more objects within the cupholder element.

With reference now to the cupholder coupler 20, the cupholder coupler can comprise any suitable component or feature that allows it to couple the cupholder element 15 to a support object (e.g., the convertible bench 30). Indeed, in some embodiments, the cupholder coupler comprises one or more clips, claps, snaps, bracket arms (or arms), mechanical engagements, frictional engagements, magnetic engagements, sleeves, and/or any other suitable coupling mechanism that is configured to the cupholder element to a support object. By way of non-limiting illustration, FIG. 24A (and to some extent, FIG. 24B) show some embodiments in which the cupholder coupler 20 comprises one or more slides 33 that are configured to slidably couple with a support object (e.g., an armrest 25). Moreover, FIGS. 24C-25M show some embodiments in which the cupholder coupler 20 is configured to snap and/or be slid on a support object (e.g., an armrest).

Figure 24A:
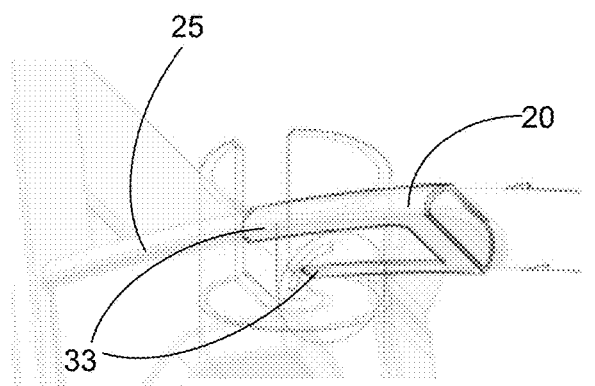
FIGS. 24A-24Y illustrate various views of some representative embodiments of an armrest coupler (or a cupholder coupler)
Figure 24B:
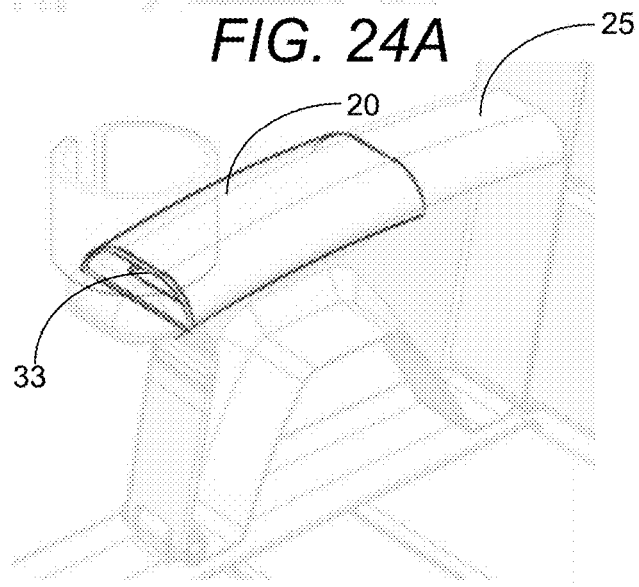
Figure 24C:
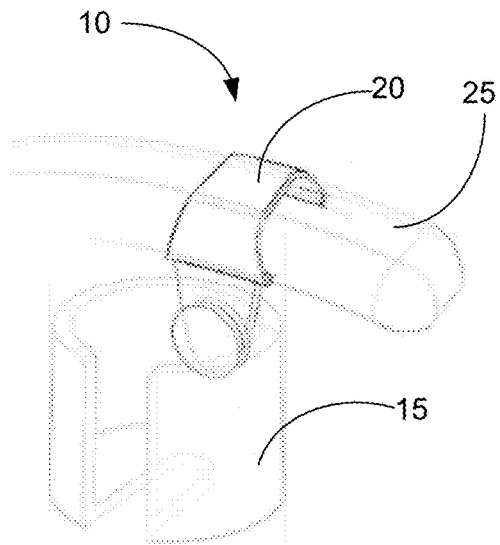
Figure 24D:
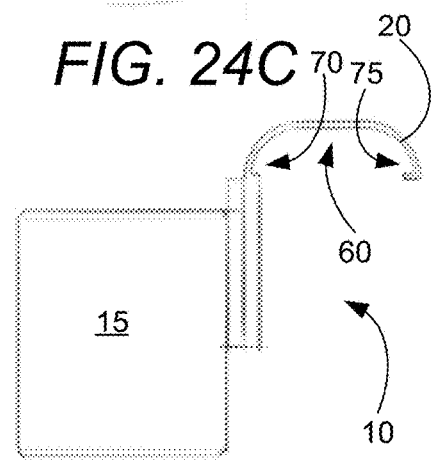
Figure 24H:
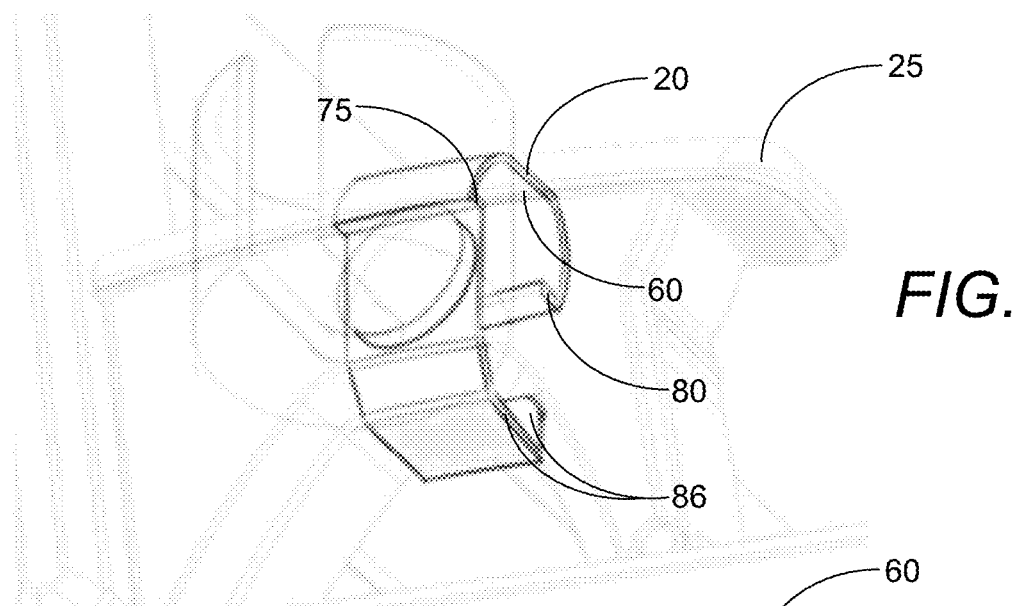
Figure 24I:
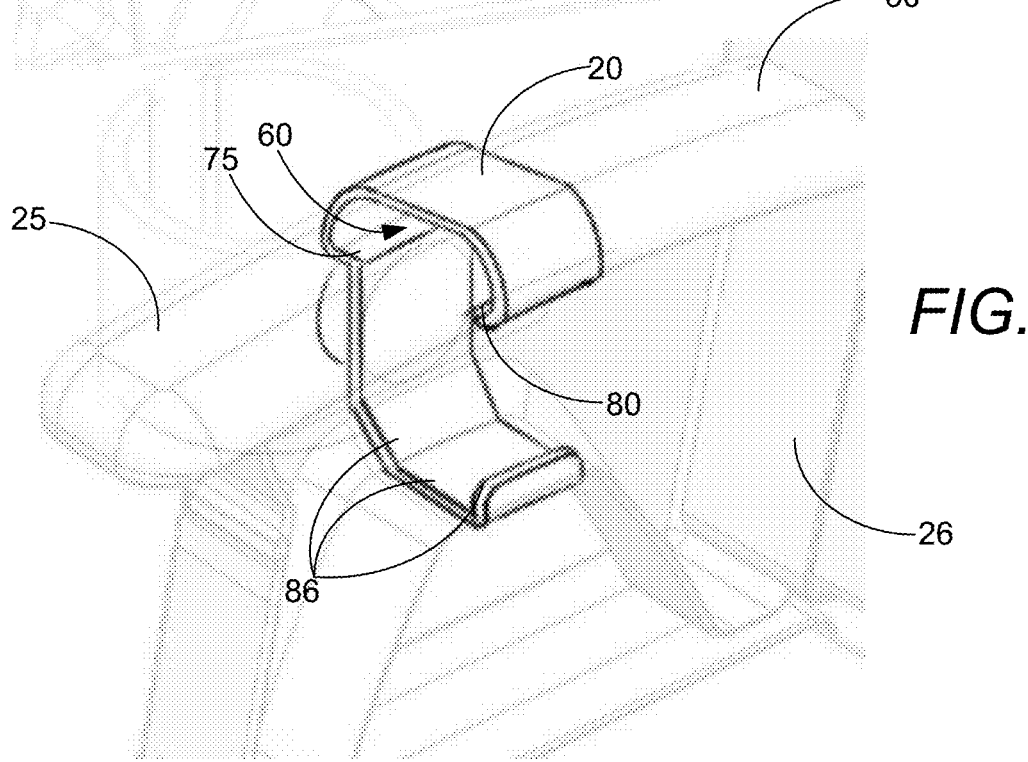

The cupholder coupler 20 can have any suitable feature that allows it to couple to one or more surfaces of a support object (e.g., the armrest 25, an armrest support 26, and/or any other suitable portion of the convertible bench 30 and/or any other suitable support object). Indeed, in some embodiments, the coupler comprises 1, 2, 3, 4, 5, 6, 7, 8, 9, or more contact surfaces that are configured to contact, apply pressure to, match a contour of a portion of, and/or otherwise couple to one or more surfaces of the support object. By way of non-limiting illustration, FIGS. 12, 24D-24G, and 24J-25L show that, in some embodiments, the cupholder coupler 20 comprises a first contact surface 60 that is configured to contact and/or extend across a first surface 65 and/or other portion of a support object (e.g., the armrest 25 of the bench 30). Moreover, such drawings (while not necessarily labeling such parts) illustrate that some embodiments of the cupholder coupler 20 optionally comprise a second contact surface 70 and/or a third contact surface 75 that are configured to respectively contact a second surface 80 and/or a third surface 85 of the support object. Additionally, FIGS. 24H-24I show some embodiments in which the cupholder coupler comprises one or more additional contact surfaces 86 (e.g., so as to contact an armrest support 26 in addition to and/or in place of the armrest 25).

While the contact surfaces (e.g., 60, 70, 75, and/or 86) can be disposed in any suitable location, FIG. 12 shows an embodiment in which the cupholder coupler 20 comprises a bracket arm or arm 90 that is configured to extend across and/or contact a first surface 65 of a support object (e.g., a first portion of an armrest 25, which is not shown in FIG. 12). Moreover, FIG. 12 shows that, in some embodiments, the second contact surface 70 is disposed at a first end portion of the arm 90 and the third contact surface 75 is disposed at a second end portion of the arm 90. Additionally, in some embodiments, the second and/or third contact surface are configured to oppose be, angled to, disposed opposite to, and/or otherwise be offset from the first surface 65 of the support object. Indeed, in some embodiments, the first surface of the support object is disposed on a first side or portion (e.g., a top surface) of an armrest and/or armrest coupler and the second and/or third surface (which can be the same surface or different surfaces) are disposed on a second side or portion (e.g., an underside) of the armrest and/or the armrest coupler.

In accordance with some embodiments, the cupholder coupler 20 optionally comprises one or more tightening mechanisms that are configured to selectively increase and/or decrease a pressure that is applied between the cupholder coupler and one or more parts of the support object (e.g., the armrest 25, an armrest support 26, etc.). While the coupler can comprise any suitable tightening mechanism, in some embodiments, it comprises one or more threaded shafts, ratcheting mechanisms, clamps, detents, pawls, resilient members, catches, magnets, and/or any other suitable mechanism that is configured to be selectively tightened and loosened. By way of non-limiting illustration, FIGS. 12-14, and 25A-25C show some embodiments in which the tightening mechanism comprises a threaded member 55 (e.g., disposed in an opening 56 (see e.g., FIG. 25K) at the second contact surface, the third contact surface, and/or any other suitable portion of the cupholder coupler 20). In some such embodiments, the threaded member can be twisted to selectively secure and/or release the cupholder coupler from a support object.

Figure 25A:
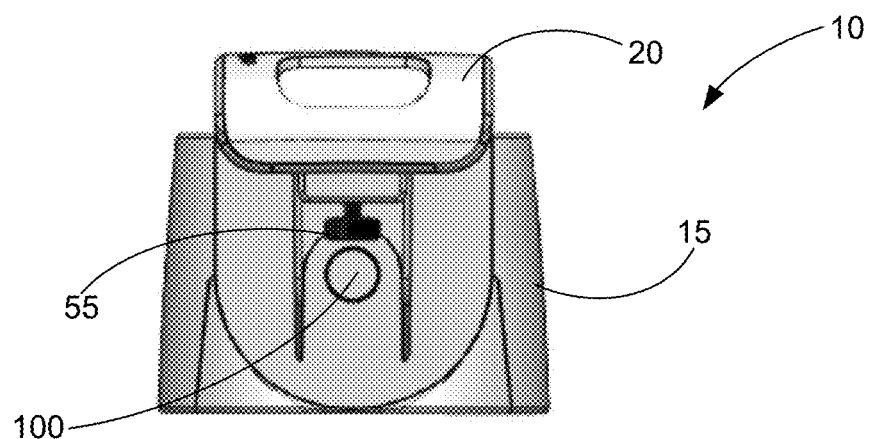
Figure 25B:
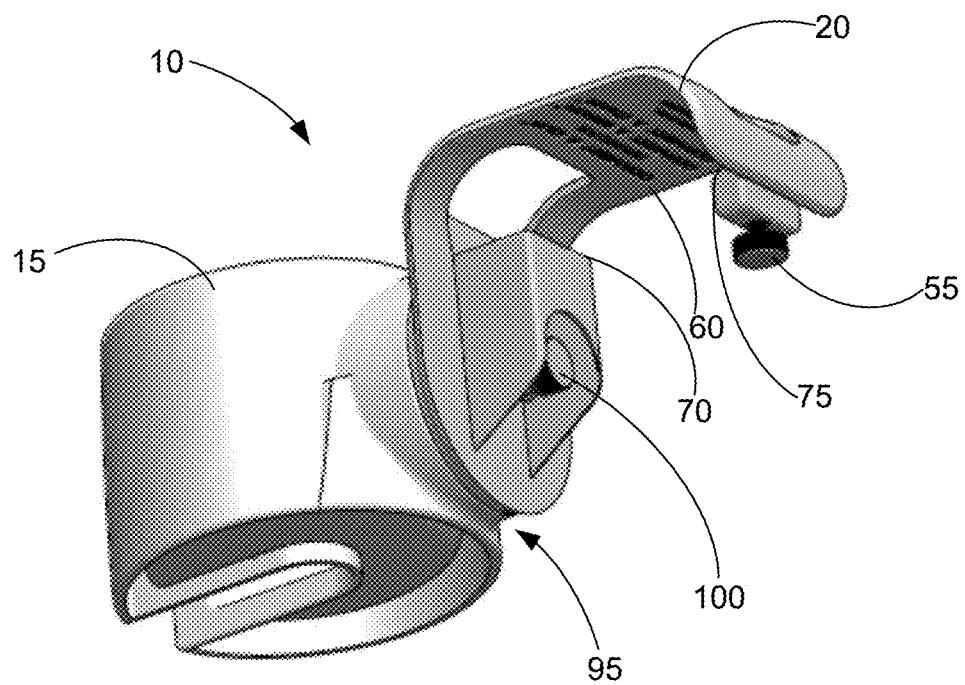
Figure 25C:
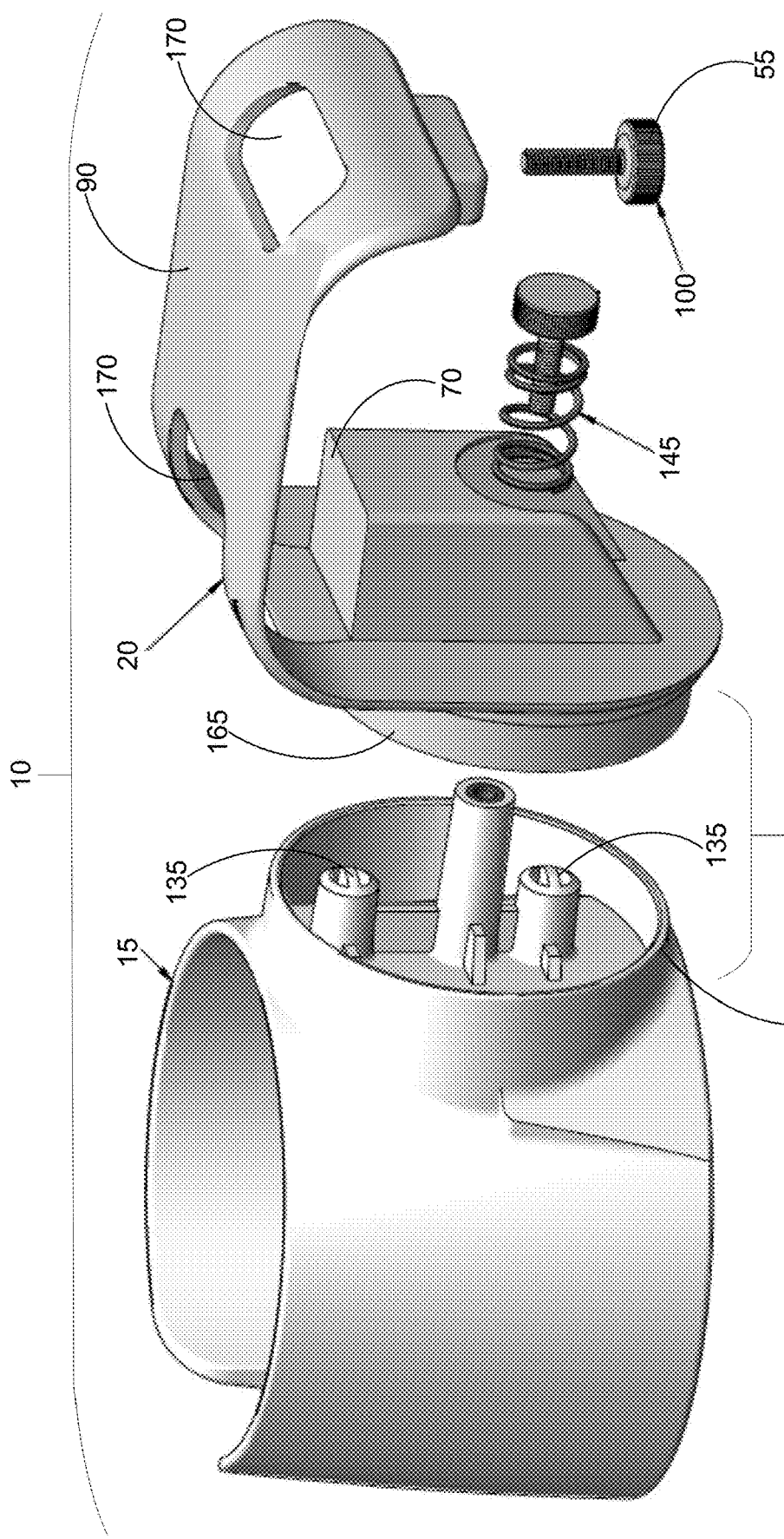
Figure 25D:
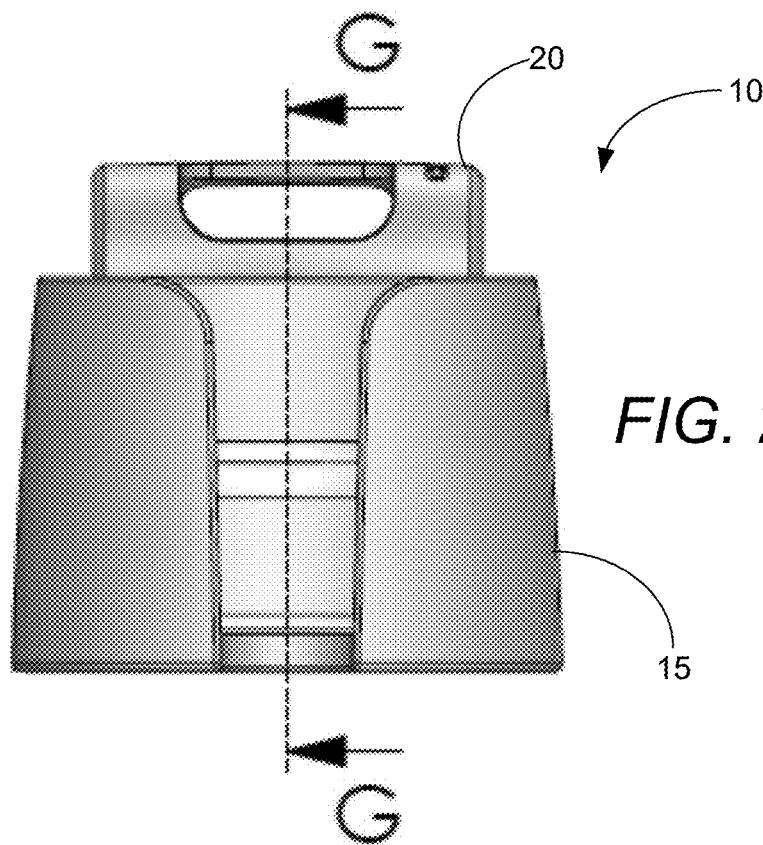
FIG. 25D illustrates an elevation view of the convertible cupholder in accordance with a representative embodiment.
Figure 25E:
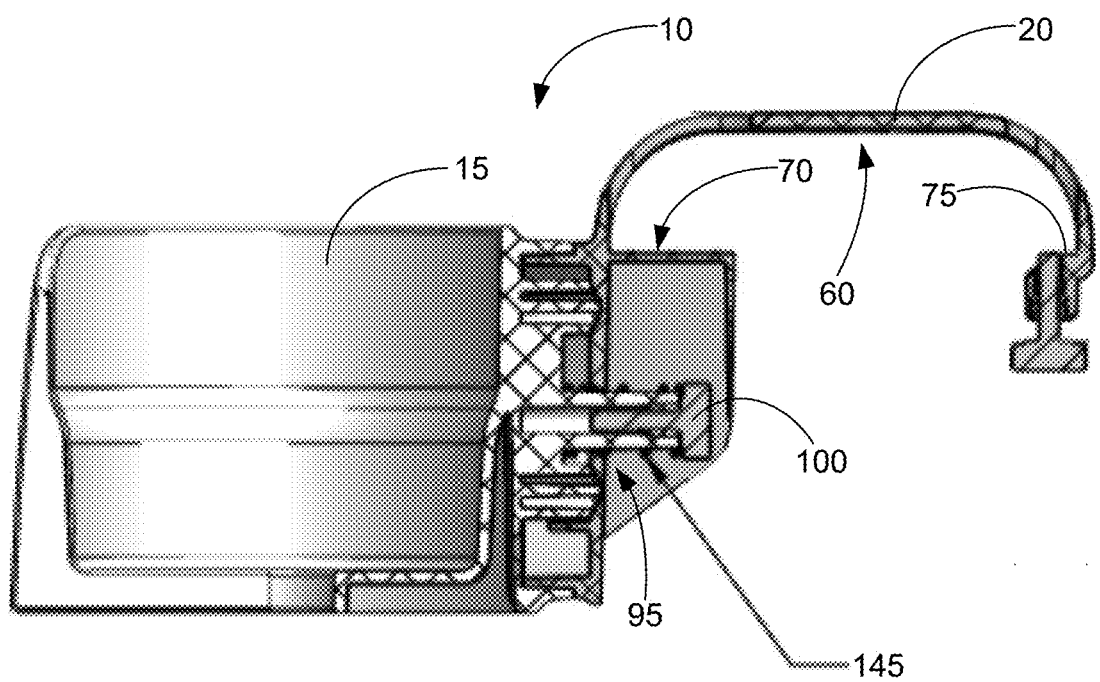
FIG. 25E illustrates a cross-sectional view of the convertible cupholder of FIG. 25D taken along line G-G.
Figure 25F:
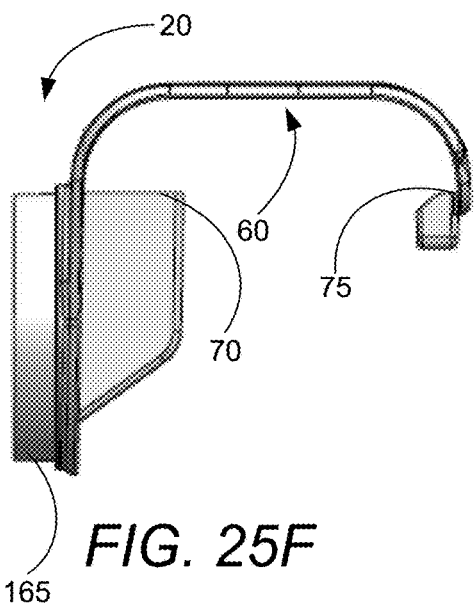
FIG. 25F illustrates a side view of an armrest (or cupholder) coupler in accordance with a representative embodiment.
Figure 25G:
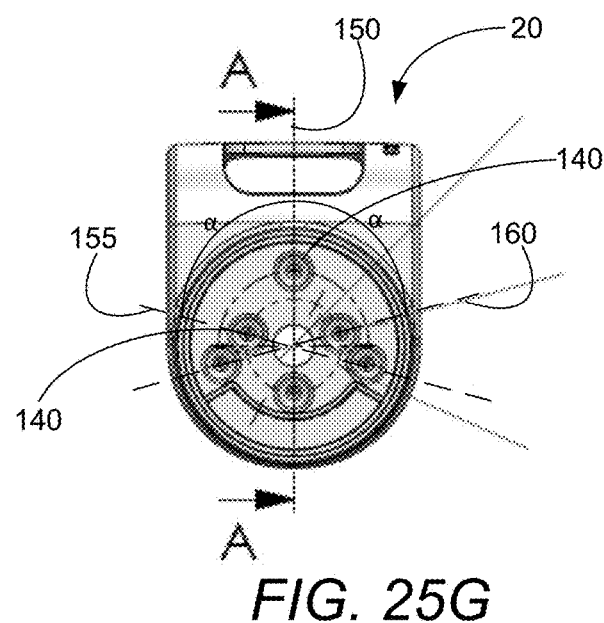
FIG. 25G illustrates a face view of the armrest (or cupholder) coupler in accordance with a representative embodiment.
Figure 25H:
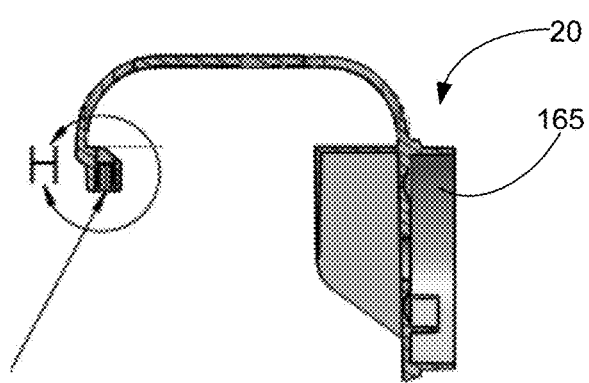
FIG. 25H illustrates a cross-sectional view of the armrest (or cupholder) coupler of FIG. 25G, taken along line A-A.
Figure 25I:
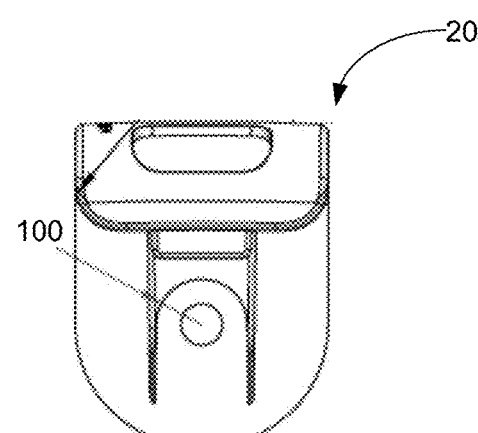
FIGS. 25I-25J illustrate various views of the armrest (or cupholder) coupler in accordance with some representative embodiments.
Figure 25J:
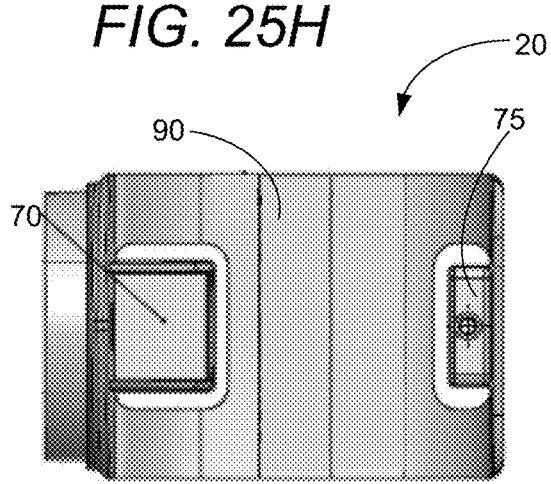
Figure 25K:
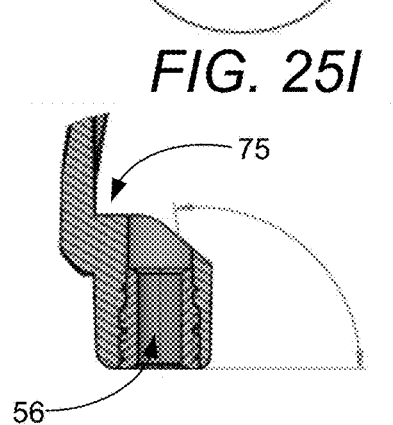
FIG. 25K illustrates an enlarged view of element H from FIG. 25H.
Figure 25L:
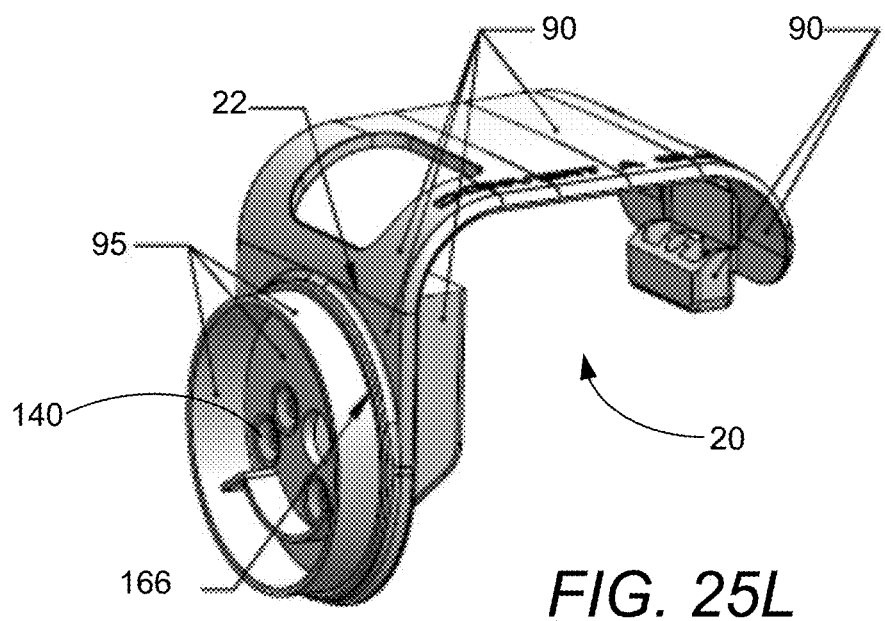
FIG. 25L illustrates a perspective view of the armrest (or cupholder) coupler in accordance with a representative embodiment.
Figure 25M:
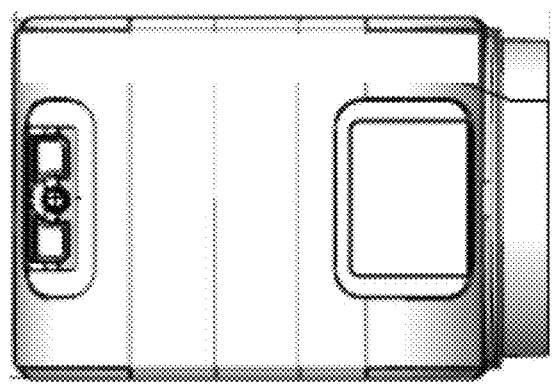
FIG. 25M illustrates a top plan view of the armrest (or cupholder) coupler in accordance with a representative embodiment.

The cupholder coupler 20 and the cupholder element 15 can couple together in any suitable manner, including, without limitation, by being integrally formed as a single piece, being movably coupled together, being pivotally coupled together, and/or by otherwise being coupled together in any manner that allows the cupholder element to hold a cup and/or other item while the cupholder coupler is coupled to a support object. Indeed, in some embodiments, the cupholder element is pivotally and/or rotatably coupled to the cupholder coupler.

Where the cupholder element 15 is pivotally coupled to the cupholder coupler via one or more pivoting mechanisms, the pivoting mechanism can be disposed in any suitable location, including, without limitation, between a side of the cupholder element and end of the cupholder coupler, between a bottom portion of the cupholder element and any suitable portion of the cupholder coupler (e.g., a side 22, as shown in FIG. 25L), and/or in any other suitable manner. By way of non-limiting illustration, FIGS. 11-14 show that in some embodiments, the cupholder coupler 20 is pivotally coupled to a side of the cupholder element 15 (e.g., such that pivotal axis of the pivot joint runs at an intersecting angle (e.g., perpendicular and/or at any other suitable intersecting axis) to a longitudinal axis of the receptacle 35 (as also shown by element C).

Where the convertible cupholder 10 comprises one or more pivoting mechanisms that pivotally couple the cupholder element 15 to the cupholder coupler 20, the convertible cupholder can comprise any suitable type of pivoting mechanism, including, without limitation, one or more hinges, pivot joints, bar linkages, flexure pivots, axles, ball and socket joints, posts and/or other members that are rotatably received in a recess, detent mechanisms, spring-loaded detent mechanisms in which one of the cupholder element and the armrest coupler comprise a process and the other of the cupholder element and the armrest coupler comprise a recess that is configured to selectively mate with the process, rotational ratcheting mechanisms, axles, bearings, rotary joints, freely-rotatable pivot joints, rack and pinion mechanisms, slot and peg linkages, and/or any other suitable mechanisms that allow the cupholder to be rotated with respect to the armrest coupler.

By way of non-limiting illustration, FIGS. 17A and 20 show some embodiments in which the pivot joint 95 comprises a first element (e.g., a shaft, a protrusion, an expanding anchor, and/or any other suitable component) that is configured to be rotatably coupled to a corresponding second element (e.g., a recess, a catch, a groove, and/or any other suitable component). Moreover, FIGS. 25C, 25E, 25H-25M, and 26A-26J show that, in some embodiments, the pivot joint 95 comprises one or more pivot points about which the cupholder element 15 is configured to rotate. In this regard, while the pivot point can comprise any suitable element about which the cupholder element 15 can rotate with respect to the cupholder coupler 20, in some embodiments, the pivot point comprises one or more threaded members, pins, posts, rivets, bearings, turntable bearings, axles, ball and socket joints, and/or any other suitable pivot points. By way of non-limiting illustration, FIG. 25C shows that, in some embodiments, the pivot point comprises one or more threaded members 100 and/or threaded receptacles 101. Moreover, FIGS. 30A-30B show some embodiments in which a first member 97 is configured to be rotatably captured by a second member 98. Additionally, FIG. 30C shows an embodiment in which a first member 97 (e.g., a member that is configured to couple with the cupholder coupler 20) is configured to rotatably couple with a second object 99 that couples with a third object 101, which is in turn rotatably coupled to a fourth object 102 (e.g., a member that is configured to couple with the cupholder element).

In some embodiments, the cupholder element 15 is configured to freely rotate about the pivot joint 95 with respect to the cupholder coupler 20, at least through some range of motion. In some embodiments, however, the cupholder element is configured to selectively rotate between one or more set positions. In such embodiments, the convertible cupholder 10 can be configured in any suitable manner that allows the cupholder element to be selectively retained at one or more positions with respect to the cupholder coupler. In other words, in some embodiments, the pivot joint comprises one or more locking mechanisms. Indeed, in some embodiments, pivot joint and/or the convertible cupholder comprise one or more detents, holes and pawls, slides and stops, ratchet mechanisms, processes and corresponding recesses, and/or any other suitable component that is configured to allow the cupholder element to be selectively maintained in and/or released from one or more set positions with respect to the cupholder coupler.

In some embodiments, the pivot joint 95 comprises one or more slides or guides 105 with stops 110 (e.g., as illustrated in FIGS. 28A-29C) that are configured to determine a maximum rotation for the cupholder element with respect to the cupholder coupler. Moreover, in some embodiments, one portion of the pivot joint (e.g., the cupholder element, the cupholder coupler, an item between the cupholder element and the cupholder coupler, and/or any other suitable portion of the joint) comprises one or more processes and another portion of the of the pivot joint (e.g., the other of the cupholder element and the cupholder coupler) comprises one or more recesses that are configured to selectively mate with the process (or processes) to determine one or more set positions for the cupholder element with respect to the cupholder coupler.

Figure 6:
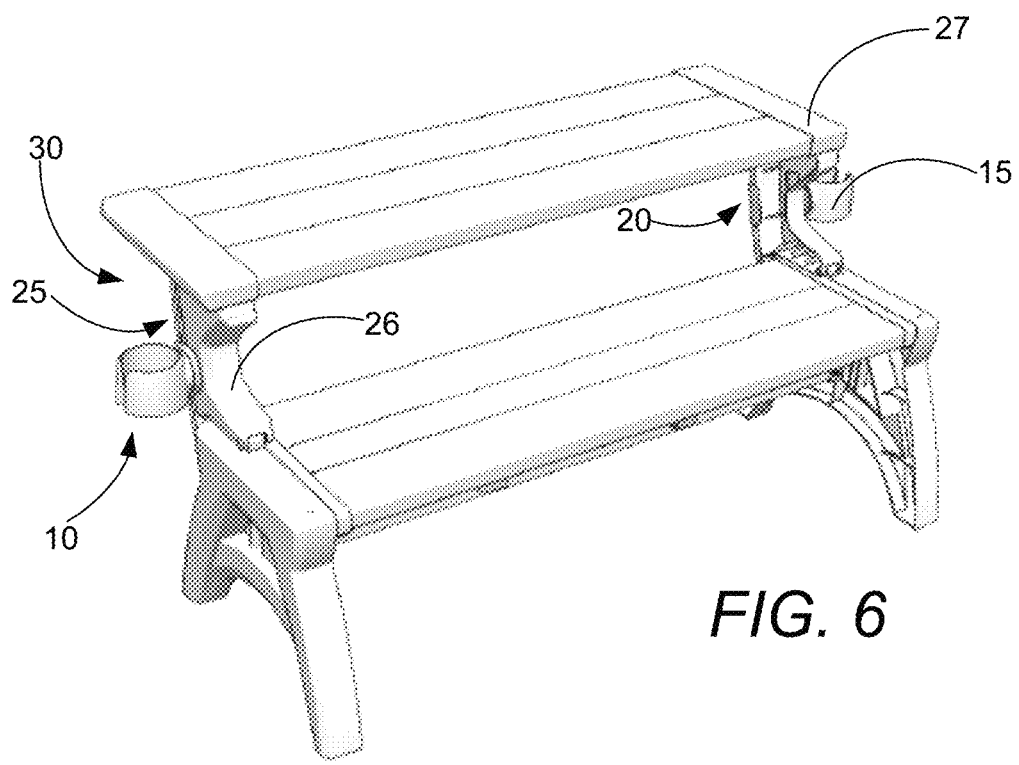
FIG. 6 illustrates a perspective view of the convertible bench in the second position with the convertible cupholder being disposed at each end of the bench in accordance with a representative embodiment.
Figure 7:
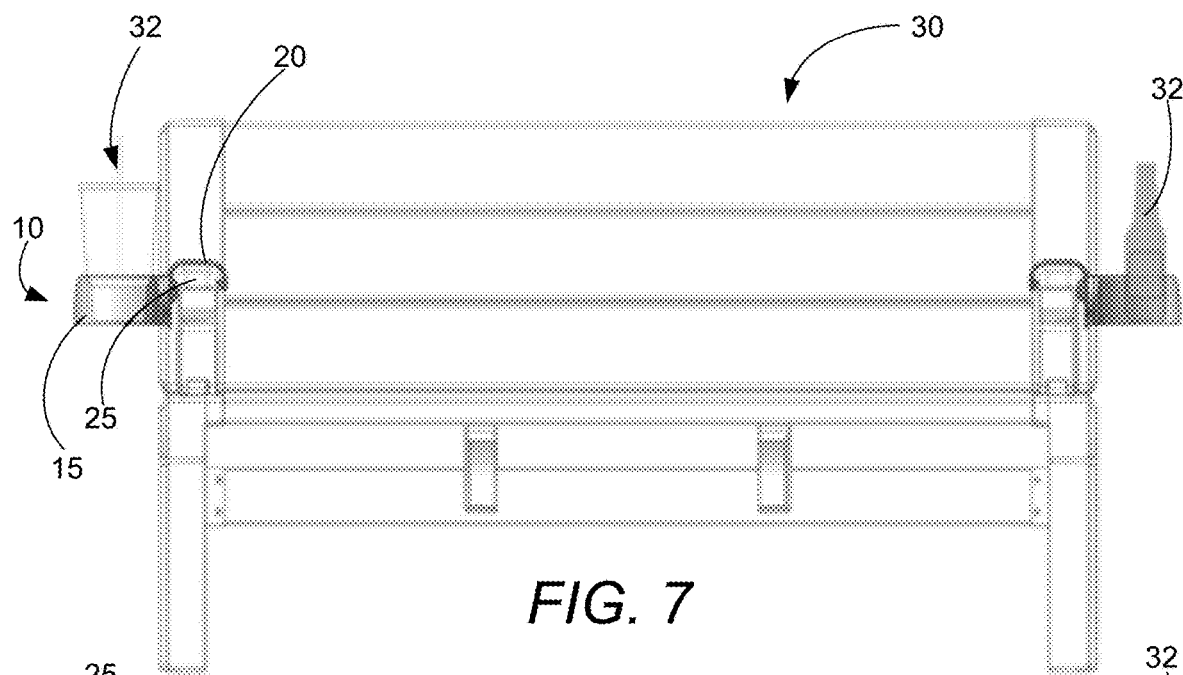
FIG. 7 illustrates a front elevation view of the convertible bench in the first position with two convertible cupholders in the first position in accordance with a representative embodiment.
Figure 8:
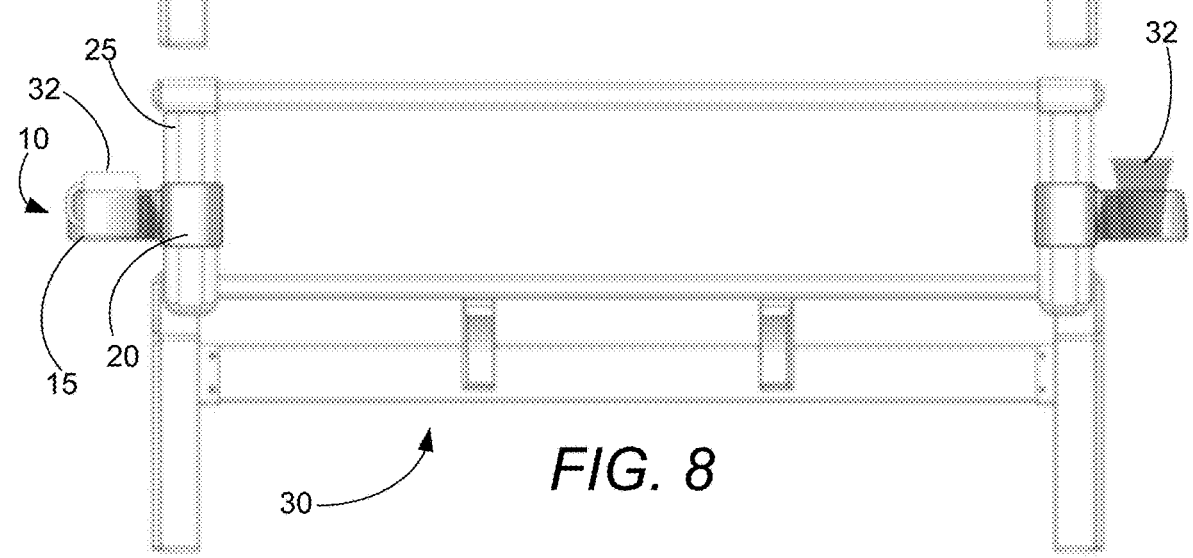
FIG. 8 illustrates a front elevation view of the convertible bench in the second position with a first convertible cupholder in the second position on one armrest and with a second convertible cupholder in the third position on the other armrest in accordance with a representative embodiment.

By way of non-limiting illustration FIG. 27A-27C show some embodiments in which a first portion 115 of the pivot joint comprises one or more processes 120 and/or recesses 125 and a second portion 130 of the pivot joint comprises one or more corresponding recesses 125 and/or processes 120, that that the two portions are configured to mate with each other at a variety of set positions. In still some other non-limiting illustrations, FIGS. 25C, 25G, 25L, 26B, and 26F show some embodiments in which the cupholder element 15 comprises one or more processes 135 that are sized and placed to selectively mate with one or more corresponding recesses 140 in the cupholder coupler 20. Although, in some embodiments, a distance between the cupholder element and the cupholder coupler is configured to remain substantially constant throughout rotation of the cupholder element with respect to the cupholder coupler, in some embodiments, a distance between the two components is configured to change slightly (e.g., as the process is twisted out of a corresponding recess) as the cupholder element rotates.

Where a distance between the cupholder element 15 and the cupholder coupler 20 is configured to vary as the cupholder element is rotated about the cupholder coupler, the distance between the components can be varied in any suitable manner, including, without limitation, by having one or more springs, elastics, and/or other resilient members be disposed between the two components; by having tolerances in the coupling between the two components that allow for a change in distance between the two components, and/or in any other suitable manner. By way of non-limiting illustration, FIG. 25C shows that in some embodiments, one or more resilient members 145 that are configured to bias the cupholder element 15 towards the cupholder coupler 20 (e.g., to help the cupholder selectively stay in and selectively be released from one or more set positions).

Where the pivot joint 95 and/or the convertible cupholder 10 comprises one or more set positions for the cupholder element 15, the set positions can be disposed in any suitable locations with respect to each other. Indeed, in some embodiments, the convertible cupholder comprises a first set position to hold the cupholder element in a first orientation (e.g., a vertical orientation to hold a drink in an upright position when the convertible cupholder 10 is coupled to an armrest when the bench 30 and/or other support object is in a first position, as shown, for example in FIGS. 1-3), whether the convertible cupholder is on a righthand side or a left hand side of the bench and/or other support object. Moreover, in some embodiments, the convertible cupholder is configured to hold the cupholder element in a second set position when the convertible cupholder is coupled to a right-hand side of the support object in its second position (e.g., as illustrated in FIGS. 4-6) and/or in a third set position when the convertible cupholder is coupled to a left-hand side of the support object when the support object is in its second position (e.g., as shown in FIGS. 5-6).

Where the pivot joint 95 and/or the convertible cupholder 10 comprises one or more set positions for the cupholder element 15, the set positions can be offset from each other by any suitable angle. Indeed, in some embodiments, a first set position of the cupholder element is offset from a second set position and/or a third set position by an angle α between 60 degrees and 115 degrees (and any subrange thereof). By way of non-limiting illustration, FIG. 25G shows that in some embodiments a first set position 150 is offset from a second position 155 by about 75 degrees±10 degrees in a first direction (e.g., counterclockwise) and from a third position 160 by about 75 degrees±10 degrees in a second direction (e.g., clockwise). Thus, in some embodiments, the described convertible cupholder is configured to hold a beverage container in an upright (and/or any other desired) orientation, when the convertible cupholder is coupled to a right armrest and/or a left armrest, whether the armrest or armrests are in their first or second positions.

In addition to the aforementioned components and characteristics, the described convertible cupholder 10 can be modified in any suitable manner. In one example, to prevent water (e.g., from rain, sprinklers, etc.) from damaging the pivot joint 95, to help prevent flesh and/or other objects from being pinched in between the cupholder element 15 and the cupholder coupler 20, and/or for any other suitable purpose, in some embodiments (e.g., as shown in FIG. 25C), the cupholder element 15 and/or the cupholder coupler 20 comprise a collar 165 and/or seat 166 (see e.g., FIG. 25L). In some embodiments (as shown in FIG. 25C) one collar 165 is configured to fit within the other.

In another example of a suitable modification, although some embodiments of the arm 90 are solid and define no openings between its first and second end portions, in some other embodiments (e.g., as illustrated in FIG. 25C) the arm 90 defines one or more openings 170 that are configured to increase a flexibility of the arm, that are configured to help a user see the support object to align the convertible cupholder element thereon, and/or for any other suitable purpose.

As another example of a suitable modification, in some embodiments, the convertible cupholder 10 comprises one or more motors and/or other actuators that are configured to rotate the cupholder element 15 with respect to the cupholder coupler 20. In such embodiments, the cupholder element can be rotated at any suitable time (e.g., via a switch, a program, a sensor reading that the support object (e.g., the armrest 25) has been pivoted and/or otherwise moved, and/or in any other suitable manner. Accordingly, in some embodiments, the convertible cupholder comprises one or more: sensors (e.g., angle sensors, position sensors, levels, inclinometers, and/or any other suitable sensor), batteries, solar cells, switches, processors, programs, corresponding apps and/or software programs, and/or any other suitable component that allows one or more motors and/or other actuators to rotate the cupholder with respect to the cupholder element.

As another example of a suitable modification, some embodiments of the cupholder element 15 are weighted at the bottom and are coupled to the cupholder coupler via a pivot joint that is configured to allow the cupholder element to freely rotate with respect to the cupholder element when the support object (e.g., armrest 25) to with the cupholder coupler is coupled is pivoted or otherwise moved. Thus, in some embodiments, much like a bench on a rotating Ferris wheel that maintains its position throughout rotation of the wheel, as the support object to which the cupholder coupler is coupled is pivoted or otherwise moved, the cupholder element is configured to substantially maintain its orientation (e.g., upright orientation) to keep any drink in the cupholder element from spilling as the support object is pivoted.

In still another example of a suitable modification, one or more edges of the convertible cupholder 10 and its various components are squared, rounded, chamfered, curved, and/or otherwise have any other suitable shape.

In addition to the described characteristics, the convertible cupholder 10 can have any other suitable characteristic. Indeed, in some embodiments, the convertible cupholder is configured to be used indoors and/or outdoors. Moreover, in some embodiments, the convertible cupholder is configured to be used on an armrest of in a vehicle, on a chair, and/or any other suitable armrest and/or any other suitable support object.

The various components of the described convertible cupholder 10 can comprise any suitable material, including, without limitation, one or more types of: polyvinyl chloride, plastic (e.g., polyethylene, high density polyethylene plastic, ultra-high-molecular-weight polyethylene, polypropylene, PVC sheet board, and/or any other suitable plastics), polymer, resin, metal (e.g., one more types of steel, aluminum, and/or any other suitable metal), metal alloys, stainless steel, ceramics, fiberglass, rubbers, polymers, pre-preg. aramid fibers, woods, carbon fibers, natural materials, synthetic materials, ultra-high-molecular weight (UHMW) materials (e.g., ultra-high-molecular weight polyethylene and/or other UHMW materials), and/or any other suitable materials. Indeed, in some embodiments, the convertible cupholder comprises one or more types of polypropylene reinforced with talc (e.g., between about 5% and about 40% by weight, or within any subrange thereof, such as about 20%±5%).

The described convertible cupholder 10 can also be made in any suitable manner. In this regard, some non-limiting examples of methods for making the described cupholder include, injection molding, extruding, cutting, folding, bending, shaping, drilling, using a computer numerical control device, connecting various pieces with one or more adhesives, mechanical fasteners (e.g., clamps, rivets, crimps, pins, brads, nails, staples, pegs, clips, screws, bolts, threaded attachments, couplers, etc.), 3D printing, additive manufacturing, welding pieces together, connecting pieces together, and/or any other suitable method that allows the described system to perform its intended functions.

Thus, some embodiments of the described systems and methods relate to cupholders. More particularly, some implementations relate to systems and methods for providing a convertible cupholder device that is configured to have a cupholder element of the device be selectively rotated and/or otherwise be moved between a variety of positions, such that when the cupholder element is coupled to a movable object (e.g., a pivoting member of a convertible bench), the cupholder element can be moved to and/or be retained in one or more desired positions (e.g., an upright position) when the movable object is pivoted and/or otherwise moved through a range of motion.

The described systems and methods may be embodied in other specific forms without departing from its spirit or essential characteristics. The described embodiments, examples, and illustrations are to be considered in all respects only as illustrative and not restrictive. The scope of the described systems and methods is, therefore, indicated by the appended claims rather than by the foregoing description. Each of the various elements of the described embodiments, implementations, figures, and examples can be mixed and matched with each other in any suitable manner. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A convertible cupholder comprising:
a cupholder element that defines a receptacle that is configured to receive a cup; and
a cupholder coupler that is rotatably coupled to a side of the cupholder element such that a pivot joint that couples the cupholder element to the cupholder coupler has a pivotal axis that runs at an intersecting angle with respect to, a longitudinal axis of the receptacle of the cupholder coupler, wherein the cupholder element is configured to rotate at least one of (i) clockwise and (ii) counterclockwise with respect to the side of the cupholder coupler by solely twisting the cupholder element with respect to the cupholder coupler, and wherein the cupholder coupler is configured to selectively couple to and decouple from a support object.

2. The convertible cupholder of claim 1, wherein the cupholder coupler comprises an arm that is configured to extend across an upper surface of the support object, wherein the arm comprises a first end portion and a second end portion, wherein the first end portion of the arm comprises a first contact surface that is configured contact a first lower surface of the support object, and wherein the first lower surface is opposed, in location, to the upper surface of the support object.

3. The convertible cupholder of claim 2, wherein the second end portion of the arm comprises a second contact surface that is configured to contact a second lower surface of the support object, and wherein the second lower surface is opposed, in location, to the upper surface of the support object.

4. The convertible cupholder of claim 2, wherein the first end portion of the arm comprises a tightening mechanism that is configured to selectively apply pressure to the first lower surface of the support object when the cupholder coupler is coupled to the support object.

5. The convertible cupholder of claim 4, wherein the tightening mechanism comprises a threaded member that is configured to be twisted to at least one of: (i) selectively increase and (ii) selectively decrease a pressure that is applied to the first lower surface of the support object when the cupholder coupler is coupled to the support object.

6. The convertible cupholder of claim 1, wherein the cupholder element comprises a base surface and a wall extending around a perimeter of the base surface to define the receptacle, and wherein the wall provides the receptacle with multiple inner diameters.

7. The convertible cupholder of claim 1, wherein the convertible cupholder further comprises a retention mechanism that is configured to selectively hold the cupholder element in at least one of two positions with respect to the cupholder coupler, and wherein the cupholder element is rotatable between the two positions by solely twisting the cupholder element with respect to the cupholder coupler.

8. The convertible cupholder of claim 1, wherein at the pivot joint that pivotally couples the cupholder element to the cupholder coupler: at least one of the cupholder element and the cupholder coupler comprises a process and the other of the at least one of the cupholder element and the cupholder coupler comprises a recess that is configured to mate with the process when the cupholder element is in a first position with respect to the cupholder coupler.

9. The convertible cupholder of claim 1, wherein the cupholder element is configured to selectively rotate between, and to be captured in, two set positions.

10. A convertible cupholder comprising:
a cupholder element that defines a receptacle that is configured to hold a cup; and
a cupholder coupler that is rotatably coupled to a side of the cupholder element and that is configured to selectively couple the cupholder element to a support object, wherein a pivot joint that couples the cupholder element to the cupholder coupler has a pivotal axis that extends towards, and that runs at an intersecting angle with respect to, a longitudinal axis of the receptacle of the cupholder coupler, wherein the cupholder element is configured to rotate at least one of: (i) clockwise and (ii) counterclockwise with respect to the side of the cupholder coupler by solely twisting the cupholder element with respect to the cupholder coupler, and wherein the convertible cupholder comprises a first contact surface that limits a clockwise rotation of the cupholder element with respect to the cupholder coupler and a second contact surface that limits a counterclockwise rotation of the cupholder element with respect to the cupholder coupler.

11. The convertible cupholder of claim 10, wherein the cupholder coupler is configured to selectively couple with the support object via a frictional fitting.

12. The convertible cupholder of claim 10, wherein the cupholder coupler comprises an arm that is configured to contact and extend across a first surface of the support object, wherein the arm comprises a first end portion and a second end portion, wherein the first end portion of the arm comprises a first contact surface that is configured contact a second surface of the support object, with the second surface being opposed, in location, to the first surface of the support object, and wherein the second end portion of the arm comprises a second contact surface that is configured to contact a third surface of the support object, with the third surface being opposed, in location, to the first surface of the support object.

13. The convertible cupholder of claim 10, wherein the cupholder element is rotatably coupled to the cupholder coupler via a spring-loaded pivoting mechanism having that is configured to selectively hold the cupholder element in one of at least two set rotational positions with respect to the cupholder coupler, and wherein the cupholder element is rotatable between the two set rotational positions by solely twisting the cupholder element with respect to the cupholder coupler.

14. The convertible cupholder of claim 13, wherein a first position of the at least two set rotational positions is offset from a second position of the at least two set rotational positions by between 60 degrees and 115 degrees.

15. The convertible cupholder of claim 10, wherein the cupholder element comprises a base surface and a wall extending from the base surface and around a portion of a perimeter of the base surface to define an inner receptacle that is configured to receive the cup, and wherein the wall defines a gap that extends from a top edge of the wall and extends from the wall into the base surface.

16. A convertible cupholder comprising:
a cupholder element, wherein the cupholder element comprises a base surface and a wall extending from the base surface and around a portion of a perimeter of the base surface to define a cup receptacle that is configured to receive a cup; and
a cupholder coupler having a face that is pivotally coupled to the wall of the cupholder element,
wherein a pivot joint that couples the cupholder element to the cupholder coupler has a pivotal axis that extends towards, and that runs at an intersecting angle with respect to, a longitudinal axis of the cup receptacle,
wherein the cupholder element is configured to rotate at least one of: (i) clockwise and iii) counterclockwise with respect to the face of the cupholder coupler by solely twisting the cupholder element with respect to the cupholder coupler,
wherein the convertible cupholder comprises a first barrier that limits a clockwise rotation of the cupholder element with respect to the cupholder coupler and a second barrier that limits a counterclockwise rotation of the cupholder element with respect to the cupholder coupler,
wherein the cupholder coupler is configured to selectively couple to and to selectively decouple from an armrest,
wherein the cupholder coupler comprises an arm that is configured to contact and extend across a first surface of the armrest, wherein the arm comprises a first end portion and a second end portion, wherein the first end portion of the arm comprises a first contact surface that is configured contact a second surface of the armrest, the second surface being opposed, in location, to the first surface of the armrest, and wherein the second end portion of the arm comprises a second contact surface that is configured to contact a third surface of the armrest, the third surface being opposed, in location, to the first surface of the armrest.

17. The convertible cupholder of claim 16, wherein the wall comprises multiple inner diameters.

18. The convertible cupholder of claim 16, wherein the cupholder element is rotatably coupled to the cupholder coupler via a spring-loaded pivoting mechanism that is configured to selectively hold the cupholder element in one of at least three set positions with respect to the cupholder coupler.

19. The convertible cupholder of claim 18, wherein the cupholder element is configured to be rotated between the at least three set positions by solely rotating the cupholder element with respect to the cupholder coupler.

20. The convertible cupholder of claim 16, wherein the first end portion of the arm comprises a tightening mechanism that is configured to selectively apply pressure to the second surface of the armrest when the cupholder coupler is coupled to the armrest, and wherein the tightening mechanism comprises a threaded shaft that is configured to be twisted to at least one of: (i) selectively increase and (ii) selectively decrease a pressure that is applied to the second surface of the armrest when the cupholder coupler is coupled to the armrest.

\* \* \* \* \*